US007577494B2

(12) United States Patent
Bader et al.

(10) Patent No.: US 7,577,494 B2
(45) Date of Patent: Aug. 18, 2009

(54) INSERT MACHINE

(75) Inventors: Eric W. Bader, Doylestown, PA (US); Peter J. Braschoss, Bethlehem, PA (US); Gary L. Davenport, Sellersville, PA (US); Robert S. James, Whitehall, PA (US); Darrell E. Pav, Orefield, PA (US); Harry C. Noll, Jr., Whitehall, PA (US); Randy R. Seidel, Allentown, PA (US); Douglas B. Walter, Nazareth, PA (US); Barry D. Yekel, Allentown, PA (US); Daniel Langengger, Brittnau (CH)

(73) Assignee: Muller Martini Mailroom Systems, Inc., Allentown, PA (US)

( * ) Notice: Subject to any disclaimer, the term of this patent is extended or adjusted under 35 U.S.C. 154(b) by 661 days.

(21) Appl. No.: 11/109,182

(22) Filed: Apr. 18, 2005

(65) Prior Publication Data

US 2005/0182511 A1 Aug. 18, 2005

Related U.S. Application Data

(62) Division of application No. 10/465,284, filed on Jun. 19, 2003, now Pat. No. 6,907,316.

(60) Provisional application No. 60/390,808, filed on Jun. 20, 2002.

(51) Int. Cl.

| | |
|---|---|
| ***G06F 7/00*** | (2006.01) |
| ***B42B 2/00*** | (2006.01) |
| ***B42B 2/02*** | (2006.01) |
| ***B65H 5/30*** | (2006.01) |
| ***B65H 39/00*** | (2006.01) |
| ***B65H 39/02*** | (2006.01) |
| ***B65H 41/00*** | (2006.01) |
| ***B65H 29/04*** | (2006.01) |

(52) U.S. Cl. .................... 700/220; 270/52.29; 271/206

(58) Field of Classification Search ................ 700/220, 700/219, 221, 228; 270/52.16, 52.29, 58.29; 271/206, 69, 82, 306
See application file for complete search history.

(56) References Cited

U.S. PATENT DOCUMENTS 4,420,150 A * 12/1983 Umezawa .................... 271/11
5,480,137 A * 1/1996 Haupenthal ................. 271/276
5,865,918 A * 2/1999 Franklin et al. ............... 156/64
5,982,129 A * 11/1999 Belec et al. ................. 318/597

* cited by examiner

*Primary Examiner*—Gene Crawford
*Assistant Examiner*—Ramya Prakasam
(74) *Attorney, Agent, or Firm*—Lucas & Mercanti, LLP

(57) ABSTRACT

The present invention discloses an improved insert machine for inserting flat material into an open pocket and, more particularly, to a straight line insert machine employed for printed matter such as newspapers. The machine includes an all-electronic control system for controlling machine functions. The control system includes at least one central control computer running under software control and a plurality of network controllers, all coupled together via a controller area network (CAN) bus. Electronic control messages for controlling machine elements are sent among the computers and controllers using a novel message protocol to enable both broadcast messages and individual messages to be employed.

5 Claims, 13 Drawing Sheets

INSERT MACHINE

CROSS REFERENCE TO RELATED APPLICATION

This application is a Divisional Application of U.S. patent application Ser. No. 10/465,284 filed Jun. 19, 2003, now U.S. Pat. No. 6,907,316 issued Jun. 14, 2005, which, in turn, claims the priority of U.S. Provisional Patent Application Ser. No. 60/390,808, filed Jun. 20, 2002. Such applications are incorporated herein by reference.

BACKGROUND OF THE INVENTION

1. Field of the Invention

This Invention relates to a high-speed insert machine for inserting flat materials into an open pocket and, more particularly, to a straight line insert machine employed for printed matter such as newspapers.

2. Art Relating to the Invention

Machines for inserting flat materials into an open pocket, especially for use with newspapers, are known (see, for example, U.S. Pat. No. 4,723,770). The '770 patent teaches a straight-line insert machine for introducing inserts into an open jacket which is held in the open pocket carried on a conveyor. Such machines are made up of a number of units or elements which act in a coordinated manner to introduce inserts into an open jacket. A "jacket" is the term used in the publishing industry to refer to newspapers, magazines, books and the like. Typically, insert machines include jacket and insert feeders, a moving conveyor carrying pockets that open and close, a missed insert repair mechanism, a product pick-up unit, and other structures. "Product" is the term used to refer to a jacket with inserts therein.

The known prior art patents and publications for insert machines normally do not show any "control system" at all for controlling all the elements and operations of an entire insert machine. Even in commercial prior art insert machines, the control system, if any, has conventionally been all-mechanical or electromechanical (such as relay-driven). There is no known prior art for an all-electronic control system, including computers, for an insert machine of the type described in the present invention.

In a conventional prior art insert machine, there are many "pockets" on a moving pocket conveyor, which forms a continuous element which is driven by a motor. Generally, there are two types of conveyors, straight line and carousel. A plurality of pockets are mounted on the conveyor and move with the conveyor. Each pocket usually comprises two walls which are movable with respect to each other, one stationary and one fixed. Generally, there are two styles of pockets, one which opens only from the top and another which opens both from the top and from the bottom. The former are referred to as top opening pockets and the latter are referred to as bottom opening pockets.

The feeders are positioned in close proximity to the conveyor and feed jackets or inserts (flat material), into the open pocket as the open pocket passes under the feeder. The pockets employ suction and lap grippers to open the jacket once it is in the pocket. A jacket feeder transfers jackets into the open pocket while a plurality of insert/jacket feeders transport inserts into the open jacket as the pocket with the open jacket passes underneath the feeder. In a preferred embodiment, the feeder of the present invention may operate either as a jacket feeder or an insert/jacket feeder.

A missed insert repair mechanism determines when an insert was not fed into the open jacket and corrects for the non feed.

The pick-up unit is also positioned in close proximity with the pocket conveyor for removing the product from the pockets after the insert has been introduced into the jacket. A gripper conveyor transports the product from the pick-up unit to an infeed device of a bundler or stacker.

As is known to those of skill in the art, each one of the elements is independently powered by an electric motor.

There is a constant need for improving insert machines to decrease the cost of production and improve the efficiency of their operation. This invention accomplishes these goals.

SUMMARY OF THE INVENTION

A new insert machine has now been developed which increases the speed of operation of the various elements of the machine, simplifies the overall operation of the machine, and decreases the manufacturing cost of the machine.

In order to accomplish this, the machine of the present Invention employs a unique all-electronic control system wherein the individual elements of the machine each are controlled by electronic network controllers. A central control computer sends and receives messages to and from the network controllers by means of a bus. The messages are addressed to the network controllers and provide activation and deactivation of selected elements at selected times. The individual network controllers read the address of each message and thereby know which messages to read and which messages to ignore.

Broadly, the invention relates to an insert machine, comprising:

- a first conveyor carrying a series of pockets in a substantially straight line,
- each pocket configured to open at the top and receive flat items;
- at least one feeder positioned above the conveyor for picking flat items from an area and feeding them into the pockets; and
- an all-electronic control system for controlling machine elements and operations.

More particularly, the control system for the insert machine of the present Invention can be defined as comprising:

- a control computer for processing and generating electronic messages for use in controlling machine functions; and
- a plurality of network controllers, each controller coupled to the control computer from a bus, and each controller configured to receive the messages from the control computer and to process and generate signals in response to the messages for controlling at least one element within the machine;
- whereby at least some of the messages from the control computer determine activation and deactivation of selected elements at selected times, and the signals from each network controller control machine operations taking place within a predetermined element.

Suitably, the insert machine is a machine for inserting flat materials into folded items, e.g. newspapers.

Preferably, the messages generated by the control computer are generated in a protocol so as to permit message differentiation and soft addressing of the network controllers, whereby some of the messages are broadcast messages that activate all of the network controllers at a given time, and others of the messages are individual messages that activate only certain ones of the network controllers at a given time.

More preferably, the protocol is configured such that a single bit in each message enables each controller to determine if a message is a broadcast message or an individual message.

Preferably, at least one network controller is connected to a quadrature encoder for receiving and processing signals from the encoder and for generating timing signals based on rotation of the encoder, the timing signals being communicated to the control computer and other network controllers to determine the exact physical position for all parts of the machine at a given time, and wherein the timing signals are dynamically changeable in real time, based on machine states, user inputs or both, and in response to messages received from the control computer.

Preferably, the control computer runs under the control of a multi-threaded control program.

Preferably, the control computer is coupled to a display computer for providing a graphical user interface.

Preferably, each network controller runs under the control of either a single-threaded program or a multi-threaded program.

Preferably, the bus comprises a controller area network (CAN) bus compliant with the ISO 11898 and 11519 protocols.

The electronic control system for controlling the operations of a machine for automatically inserting flat materials into folded items in accordance with the present Invention can also be defined as comprising:

a control computer for processing and generating electronic messages for controlling machine functions; and a plurality of network controllers, each controller coupled to the control computer via a bus, and each controller configured to receive the message from the control computer and to process and generate signals, either in response to or independent of the messages, for controlling machine operations of at least one element of the machine;

whereby at least some of the message from the control computer determine activation and deactivation of selected elements at selected times, and the signals from each network controller control all machine operations taking place within a predetermined element; and whereby in the event of failure or interruption of the control computer or the messages from the control computer, all network controllers continue to process and generate signals for controlling all machine operations necessary to complete a current machine run at an acceptable level of performance.

The electronic control system for controlling the operations of a machine for automatically inserting flat materials into folded items in accordance with the present Invention can also be defined as comprising:

a control computer for processing and generating electronic messages for controlling machine functions;

a plurality of sensors within the machine for sensing states of machine elements or portions of machine elements;

a plurality of network controllers, each controller coupled to at least one sensor and to the control computer via a bus, and each controller configured to receive information from the sensors and the messages from the control computer and to process and generate signals for controlling all machine operations within at least one element;

whereby the control computer and the network controllers perform active diagnosis of all elements in real time and, upon the sensing of a failure of any element or portion of an element, the control computer and/or the network controller assigned to control the failed element automatically deactivates the failed element.

Furthermore, the electronic control system for controlling the operations of a machine for automatically inserting flat materials into folded items, comprising:

a control computer configured to receive and process machine sensor information and to process and generate electronic messages for controlling machine operations;

a plurality of sensors within the machine for sensing performance of elements of the machine;

a plurality of network controllers, each controller configured to receive and process information from the sensors, each controller coupled to the control computer via a bus, and each controller configured to receive the messages from the control computer and to process and generate signals for controlling machine operations of at least one element of the machine;

whereby at least some of the messages from the control computer activate or deactivate selected elements at selected times, and the signals from each network controller control machine operations taking place within a predetermined element; and whereby the control computer automatically calculates an optimized overall throughput rate for the machine in real time based on the sensed performance of elements, determines which elements, if any, need operational adjustment in an attempt to achieve the optimized throughput rate, and then automatically adjusts the operation of the elements needing adjustment by generating and sending updated messages to each network controller assigned to control each element needing adjustment.

Furthermore, improvements have been discovered for the feeder. Some of the improvements relate to the vacuum means for use in the feeder, and, more specifically, to the vacuum control system and the sucker bar arrangement.

The improvement relates to the vacuum control system and can be defined as comprising:

a vacuum source and an air source;

a movable suction cup coupled to the vacuum source and air source for periodically grabbing and removing items from a first area by means of vacuum suction;

a second area for receiving each item after removal, the second area moving relative to the first area at a variable speed;

at least one sensor/encoder associated with the second area for sensing the speed and position of the second area relative to the first area and generating speed and position signals corresponding thereto; and a servo drive coupled to the sensor/encoder to control vacuum/air valves;

whereby, upon detecting a change in speed of the second area, the servo drive automatically alters control signals to the valves so as to alter the application of vacuum and air to the suction cup corresponding to the change in speed of the second area.

Preferably, the sensor/encoder comprises a slave encoder coupled to a feeder and to a master encoder for generating timing signals as the second area moves.

In the vacuum system, the first area comprises a tray and the second area comprises a rotating drum rotating at a variable speed.

In the vacuum system, the servo drive includes a servo control and a memory storing data representative of (a) a plurality of speeds of rotation of the drum, and (b) predetermined vacuum and air start and stop times for each speed, each time corresponding to an angular movement of a point on the drum relative to a fixed reference point for each speed. The vacuum and air points are changed with changing drum speeds to optimize the feeding function. The angular position of the drum controls the vacuum and air start and stop times.

The vacuum system is configured such that the vacuum is turned on sooner when the drum speed increases, thus optimizing the feeding function.

The improved vacuum system can also be defined as a method for controlling a vacuum at a variable rate corresponding to a variable rotational speed of a rotating drum, comprising the steps of:

providing a vacuum source;

determining a fixed reference point and a drum point located on the drum;

calculating the rotational speed and angular position of the drum using the reference point and the drum point;

determining a start time for the vacuum relative to the reference point;

starting the vacuum when the drum point reaches a first predetermined angular displacement away from the reference point;

determining a stop time for the vacuum relative to the reference point; and stopping the vacuum when the drum point reaches a second predetermined angular displacement away from the reference point.

Preferably, the steps of calculating, determining, starting and stopping are performed by a servo drive under software control.

Preferably, data representative of the first and second angular displacements are stored in a memory in a servo drive, and data representative of the vacuum start and stop times are stored in the memory for a plurality of rotational speeds of the drum. The functions for determining air and vacuum times are stored for a plurality of rotational speeds of the drum.

Other improvements to the vacuum means relates to the sucker bar arrangement of the feeders. These improvements to the sucker bar are suitably defined with respect to a conventional vacuum device for a feeder of flat material to a moving element wherein said feeder has a tray for holding said flat material, said vacuum device separating the flat-material from the tray and a gripper drum for gripping and transporting the separated flat material to the moving element, the improved sucker bar arrangement of the present Invention comprising:

a stationary vacuum manifold having a plurality of outlets;

a pivoting shaft oriented parallel to said gripper drum axle;

a plurality of sucker tubes affixed to said shaft and oriented normal to said shaft;

a plurality of sucker cups one of each sucker cups affixed at one end of said sucker tubes;

a plurality of flexible hoses, one end of said flexible hoses affixed to said outlets of said manifold and the other end of said flexible hoses affixed to the other end of said stems so as to provide a vacuum to said sucker cups.

Preferably, the sucker bar arrangement has an air inlet in said manifold.

Alternatively, instead of a vacuum manifold, a set of stationary valves may be used for both vacuum and air.

Preferably, said pivot shaft is easily removable from said feeder, and more preferably, said pivoting shaft has a fixed pivoting angle.

Another improvement in the feeders has been found in the tray assembly for each of the feeders which improves the feeder's overall operation. More specifically, an improved tray assembly for a feeder of flat material to a moving element wherein said feeder has a tray assembly for holding a plurality of flat material, said tray assembly having a bottom wall on which said flat material rest and a front wall which abuts a side of said flat material, a vacuum device for separating the flat material from the tray assembly and a gripper drum for gripping and transporting the separated flat material between the bottom wall and the front wall to the moving element, the improved tray assembly comprising:

said front wall and said bottom wall form an angle of about 85 to about 95° and said bottom wall forms an angle greater than or equal to about 11° with the horizontal.

Preferably, said angle, with the horizontal is about 11°.

More preferably, said front wall of the tray assembly vibrates forward and backward to help align said flat material in said tray assembly.

Preferably, the angle between said bottom wall and said front wall is substantially perpendicular.

Preferably, a back wall of the tray assembly is movably fixed to the frame. It can move backward and forward to accommodate different sized products.

Yet another improvement in the feeder relates to the drive means for the feeder drum. Specifically, the improved drive means is a frameless motor directly driving the shaft of the feeder drum. Such an arrangement eliminates belts, gears, line shaft and associated drives. As such, it reduces cost, reduces maintenance and improves efficiency of the feeder.

More specifically, this improved drive means for the feeder can be defined as an improved drive motor for a gripper drum of a feeder of flat material to a moving element wherein said feeder has a tray assembly for holding flat material, a vacuum device for separating said flat material from said tray assembly, and a gripper drum for gripping and transporting a separated flat material to the moving element, said improved drive motor comprising:

a winding or stator affixed to a frame of said feeder; and a rotor affixed to a shaft of said gripper drum and positioned between said winding or stator and said shaft.

Suitably, said winding or stator is concentric with said shaft of said gripper drum and said rotor is concentric with said shaft of said gripper drum.

Improvements in a pocket have also been discovered. These improvements relate to the physical design of the pocket and to both top opening and bottom opening pockets.

The improved pocket design includes ridges along the bottom of the pocket to help hold the jacket in a top opening pocket, a square pocket bottom for a top opening pocket, an on-the-fly adjustable pocket gripper for both top and bottom opening pocket, and a pocket latch for a top opening pocket.

The improved pocket with ridges can be defined as an improved top opening pocket for an insert machine wherein said machine has a conveyor with a plurality of pockets attached to said conveyor and feeders positioned along said conveyor for feeding flat material into a moving open pocket, and improved pocket comprising:

a leading wall, a trailing wall and a bottom wall which connects said leading wall to said trailing wall, and two or more ridges which run parallel with a long axis of the bottom wall.

Preferably, said ridges extend along the entire length of said bottom wall. More preferably, there are three ridges. Each of said ridges are formed by a line of bumps in said bottom wall.

The squared pocket of the present Invention can be defined as an improved top opening pocket for an insert machine wherein said machine has a conveyor with a plurality of pockets attached to said conveyor and feeders positioned along said conveyor for feeding flat material into a moving open pocket, the improved pocket comprising:

a leading wall, a trailing wall and a bottom wall which connects the leading wall to the trailing wall, said bottom wall forming a substantially right angle with said leading wall.

Preferably, said bottom wall is integral with said leading wall and said trailing wall can pivot with respect to said bottom wall.

More preferably, said leading wall is integral with said conveyor and said trailing wall moves relative to said conveyor.

The pocket latch of the present Invention provides for an improved top opening pocket for an insert machine wherein said machine has an endless conveyor with a plurality of pockets attached to said conveyor and feeders positioned along said conveyor for feeding flat material into an opening moving pocket and said pocket returns inverted, the improvement comprising:

- said pocket having a leading wall, a trailing wall, a side wall integral with said leading wall, and a bottom wall connecting the leading wall to the trailing wall, said trailing wall being spring biased against said leading wall;
- a latch affixed to said side wall of said pocket, said latch having two positions,
- a first position where said latch is inactivated and said back wall of said pocket is movable into an open and closed position to accept flat material from said feeders when said pocket is in an upward position, and
- a second position where said latch is activated to hold partially open said pocket when said pocket is returned in an inverted position.

The pocket latch improvement of the Invention is also used for improved product repair functions. The first position of the latch allows the pocket to close fully.

The adjustable pocket gripper of the present Invention when employed with the pocket results in an improved pocket for an insert machine wherein said machine has a conveyor with a plurality of pockets attached to said conveyor feeders positioned along said conveyor for feeding flat material into a moving open pocket and said pocket having a leading wall, a trailing wall and a bottom wall, said improvement comprising:

- an adjustable pocket gripper, said adjustable pocket gripper having an elongated housing which is hinged to said leading wall, said housing movable from a vertical position to a horizontal position;
- a gripper bar for gripping said flat material in said pocket when said housing is in a vertical position, and
- a moving means positioned in said elongated housing and attached to said gripper bar for moving and holding the position of the gripper bar when said housing is in a horizontal position.

Preferably, said moving means comprises:

- a spring loaded car which moves in said housing, said car attached to said gripper bar,
  - stops in said housing for holding said car in a position, said car movable between said stops,
    - a latch attached to said car for moving said car between stops in one direction from one end stop to another end stop,
  - a release attached to said car for releasing said car from said stops and moving said car in the other direction to the one end stop.

Preferably, said car is spring biased in said other direction.

An improved gripper device for flat material has also been discovered wherein said device holds flat material in a vertical orientation between two arms, said device having a spring means for biasing said arms in a closed position, one arm being fixed and the other arm being movable between an open and closed position, the improvement comprising:

- a latch means affixed to said device for applying pressure to said spring means to ease the tension in said spring means and allow said other arm to be moved to the open position under reduced spring tension.

These and other aspects of the present Invention may be more fully understood by reference to one or more of the following drawings.

DETAILED DESCRIPTION OF THE INVENTION

Figure 1:
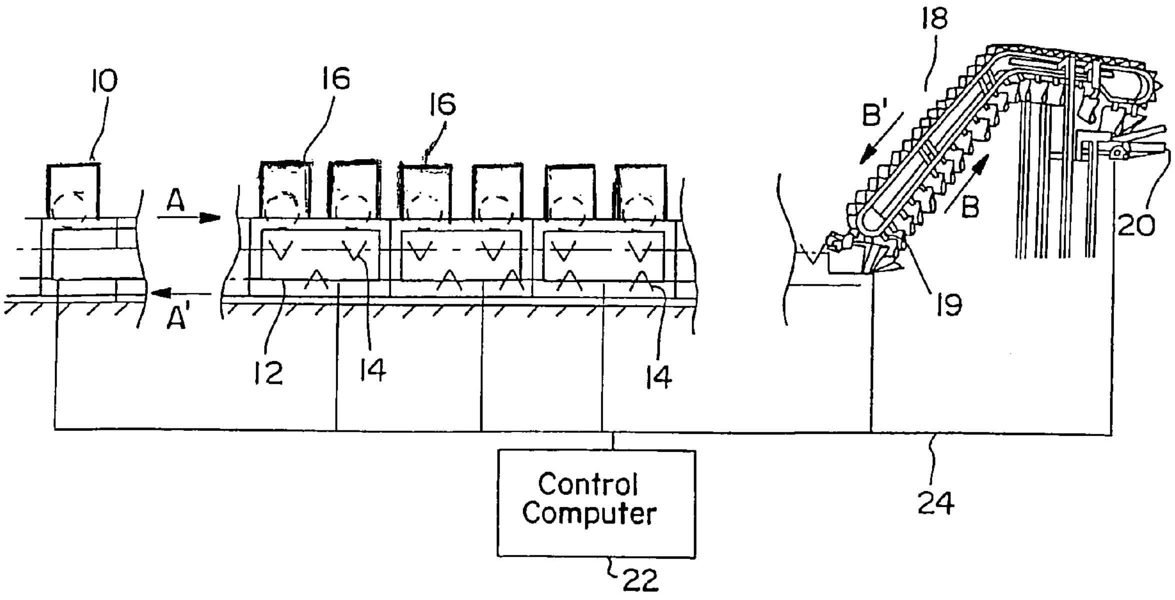
FIG. 1 is a pictorial overview of the present Invention.

FIG. 1 illustrates an overall view of the present Invention. As shown in FIG. 1, jacket feeder 10 is positioned above conveyor 12. A plurality of pockets 14 are mounted on conveyor 12 and travel with conveyor 12. A plurality of insert/jacket feeders 16 are also mounted above conveyor 12 for introducing inserts into an open jacket contained in pocket 14. Preferably, feeders 10 and 16 are interchangeable. Conveyor 12 travels along a direction marked by arrow A and returns in direction marked by arrow A'. Pockets 14 on the bottom of conveyor 12 are illustrated in an open position. Each pocket 12 moves past product pick-up until 18 which removes the jacket with inserts (i.e. product) from pocket 14. Product pick-up unit 18 has overhead grippers 1-9 attached to a conveyor which travels in a direction B with a product and deposits the product on bundler 20. The conveyor of product pick-up unit 18 returns in the direction of arrow B'.

Each one of the individual elements, i.e. jacket feeder 10, conveyor 12, insert/jacket feeder 16, product pick-up 18, and bundler 20, employ individual motors and a network controller which control the operation of the unit. As shown in FIG. 1, a control computer 22 communicates with and controls each one of the individual elements by bus 24 so as to provide overall control and coordination between each of the individual elements. Good results have been obtained by employing one network controller per pair of insert/jacket feeder 16 as shown in FIG. 1, however, individual network controllers can be used for each insert/jacket feeder 16.

Figure 2:
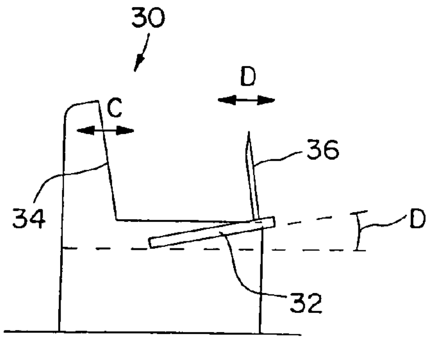
FIG. 2 is an illustration of the tray assembly of the feeders of the present Invention.

As shown in FIG. 2, tray assembly 30 is employed for feeder 16. Assembly 30 has slanted bottom wall 32 which forms angle D with a horizontal as shown. Preferably, angle D is about 11° . Front wall 34 of assembly 30 is a jogger which moves backward and forward as indicated by arrow C to keep the flat material aligned in the tray. Specifically, the jogger is an arm on an eccentric wheel attached to the bottom of front wall 34, however, any conventional jogging mechanism can be employed. The type of front wall 34 is hinged to the frame of assembly 30.

In feeder 16, the jackets are placed such that their spine is against front wall 34.

Figure 3:
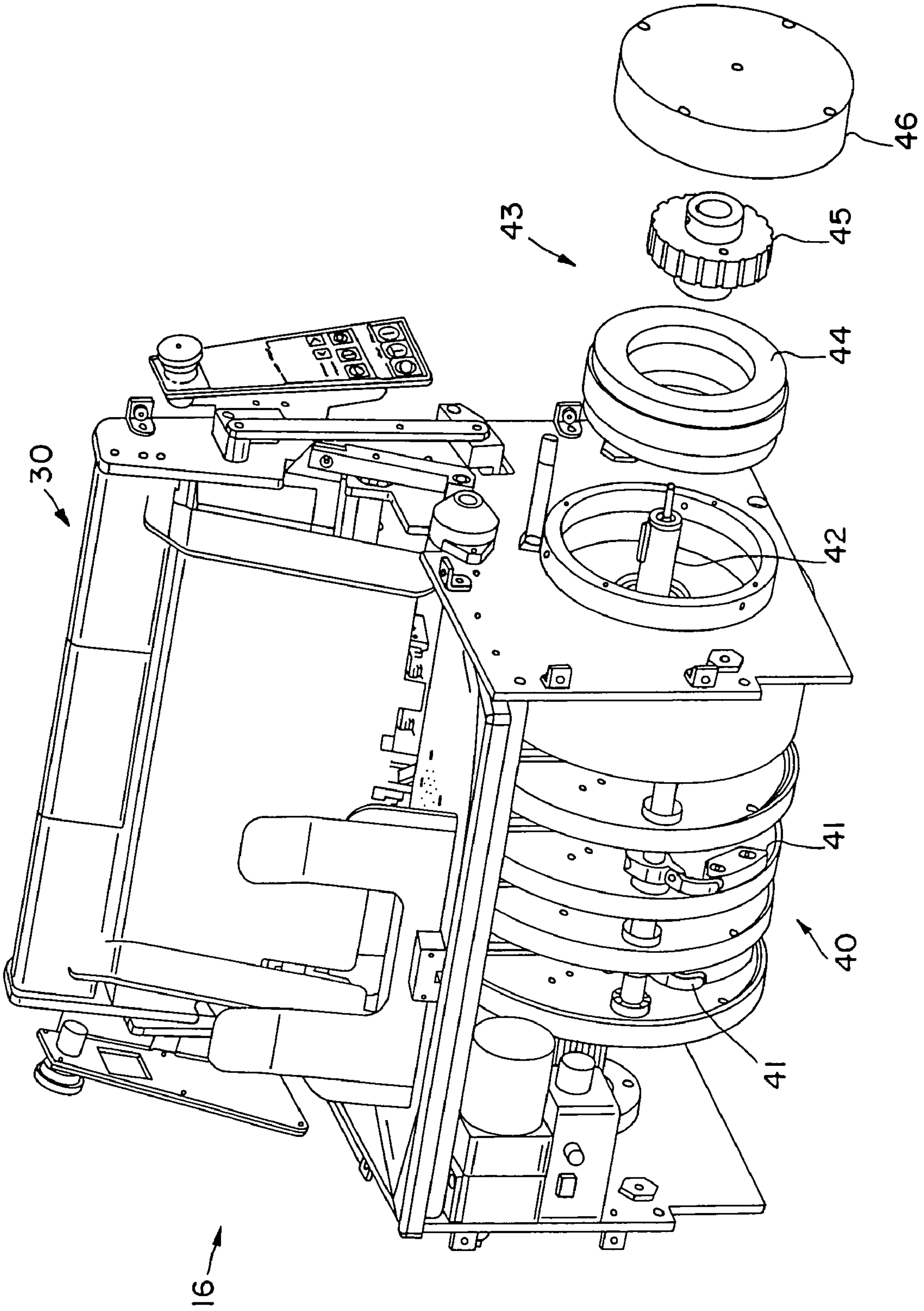
FIG. 3 illustrates the motor arrangement for the feeders of the present Invention.

FIG. 3 illustrates the motor arrangement for the feeders. Specifically, FIG. 3 illustrates insert/jacket feeder 16. Feeder 16 has drum 40 with grippers 41 mounted on shaft 42. On the outside of shaft 42 is mounted motor 43 which comprises winding or stators 44 and rotor 45. FIG. 3 is an exploded view. Cover 46 mounts over motor 43. Motor 43 is a frameless motor which operates directly on shaft 42.

Grippers 41 attach to an insert which has been separated from tray assembly 30 by the sucker bar arrangement and then transport the insert to an open pocket.

Any conventional frameless motor can be used in the feeders of the present Invention.

Conventional rotary encoders are employed with motor 43 and are connected to the network controller for the feeder so as to determine the speed at which motor 43 is operating. Master and slave encoders may both be employed.

Figure 4A:
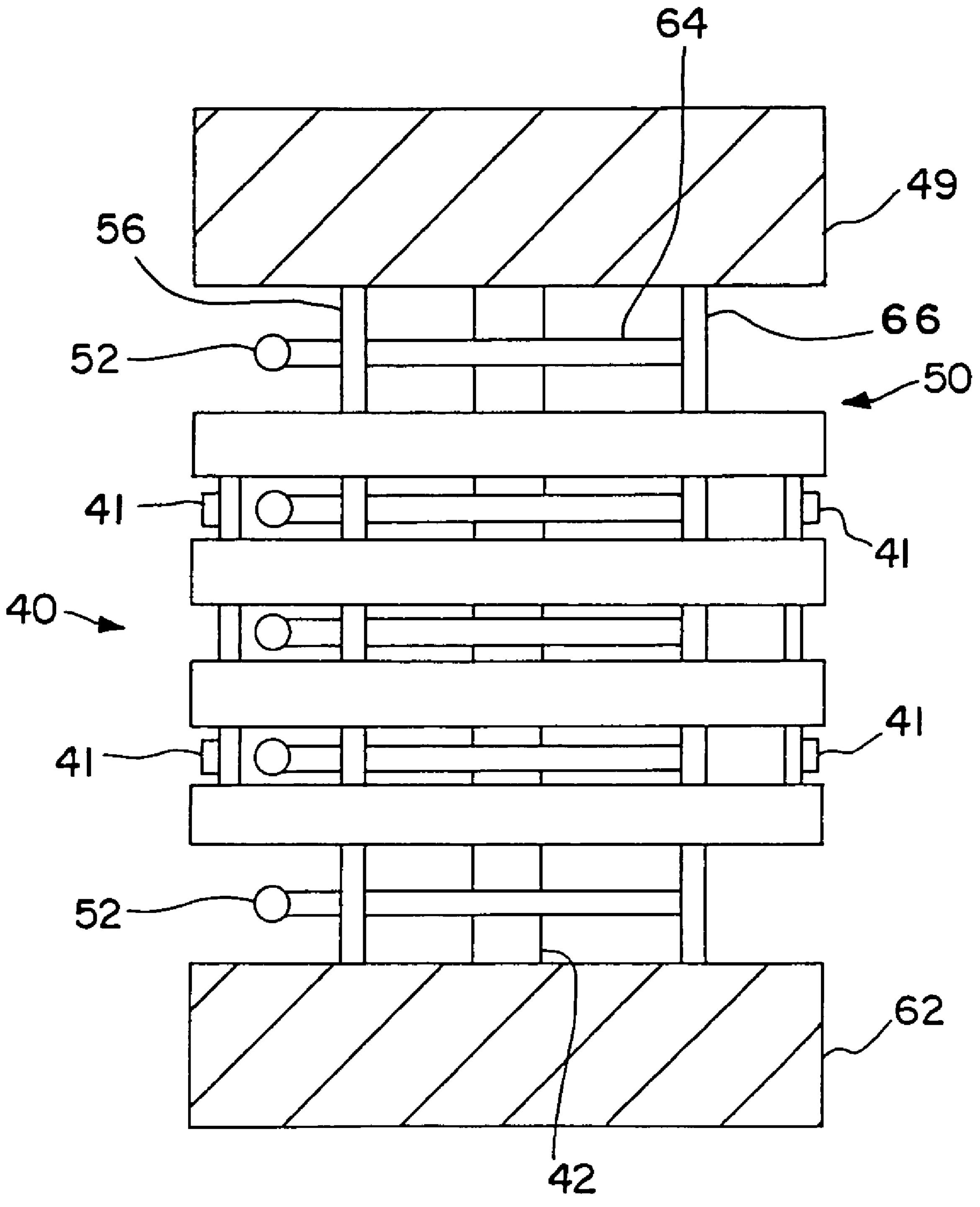
FIGS. 4A and 4B show the sucker bar arrangement for the feeder of the present Invention.
Figure 4B:
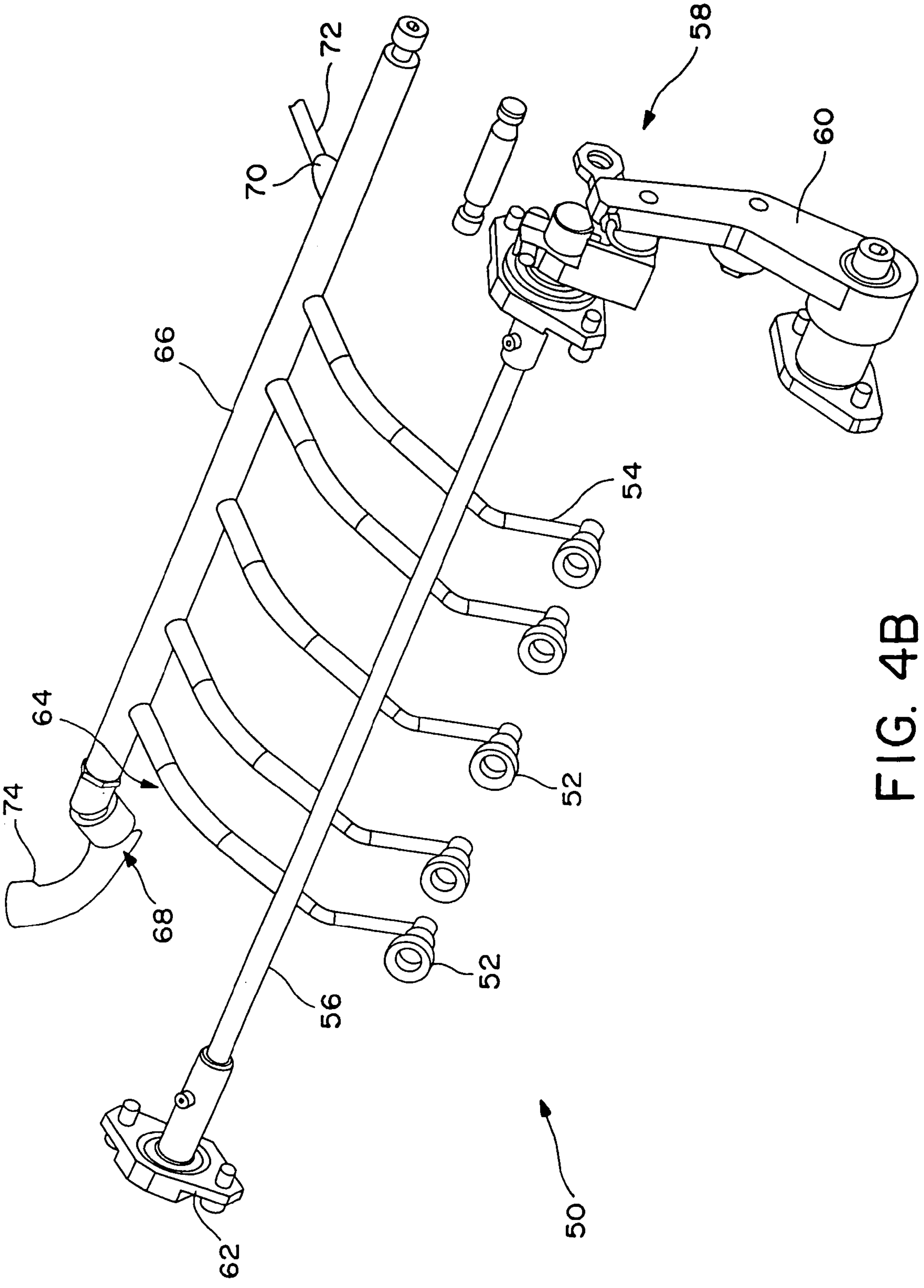

FIG. 4A is a view of a feeder with sucker bar arrangement 50 for the feeder while FIG. 4B is a perspective view of sucker bar arrangement 50 only. As shown in FIG. 4B, sucker bar arrangement 50 has sucker cups 52 connected to sucker tube 54. Sucker tube 54 is made of rigid material such as metal through which the vacuum travels. Tube 54 is integral with shaft 66 which rocks by means of pivot mechanism 58 which comprises pivot arm 60 and bearing support 62. Flexible tubing 64 connects tube 54 to outlets of vacuum manifold 66. Vacuum manifold 66 has two inlets, vacuum inlet 68 and air inlet 70. Air inlet 70 is connected to airline 72 while vacuum inlet 68 is connected to vacuum line 74. At each inlet is a valve connected to the network controller to control the vacuum and air provided to sucker cup 52. Air is used to release the vacuum.

The pivot angle is preferably fixed but may also be adjustable. The short stroke of the cups allows for decreased response time and increased speed. The movement, vacuum and air is coordinated with the movement and operation of gripper 41 to facilitate the movement of flat material from tray assembly hopper 30 to open pocket 14.

Figure 5:
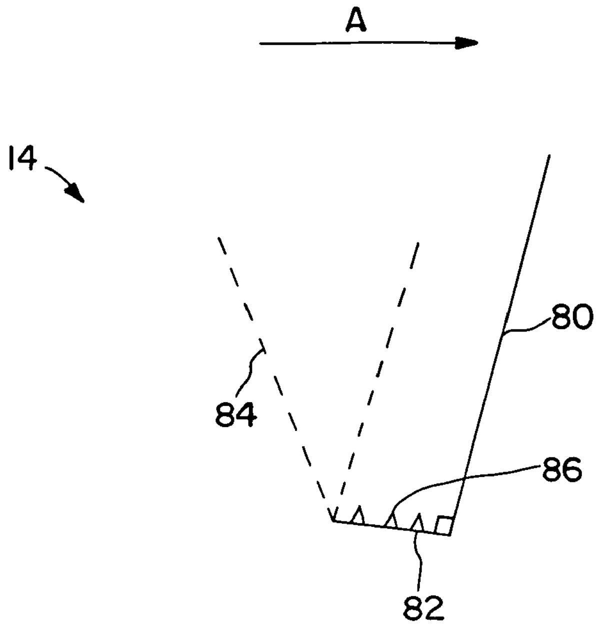
FIG. 5 illustrates the square pocket of the present Invention.

FIG. 5 illustrates pocket 14 which moves in direction of arrow A. Pocket 14 comprises leading wall 80, bottom wall 82 and trailing wall 84. The angle between leading wall 80 and bottom wall 82 is fixed at 90E. Leading wall 80 is attached to conveyor 12. Trailing wall 84 is movable for opening and closing pocket 14. Suitably, pocket 14 is made of plastic material, however, it can be made of any conventional material. Additionally, the mechanics for opening and closing the pocket by means of moving trailing wall 84 is conventional. Preferably, trailing wall 84 is spring biased in a closed position. Ridges are optional.

Figure 6:
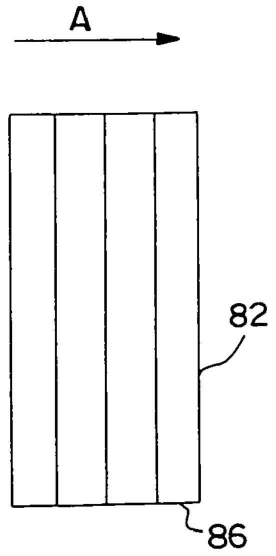
FIG. 6 illustrates the ridges in the bottom of the pocket of the present Invention.

Also, as shown in FIG. 5 and further illustrated in FIG. 6, bottom wall 82 has ridges 86. A top view of bottom wall 82 is provided in FIG. 6 showing three ridges 86 which extend the entire length of bottom wall 82. Ridges 86 can be a continuous ridge which extend along the entire length of bottom wall 82 or, alternatively, they can be a series of bumps which from the side appears one continuous ridge. Furthermore, ridge 86 can be discontinuous and need not extend the whole length of bottom wall 82.

The purpose of ridge 86 on bottom wall 82 is to help catch and maintain the position of the spine of the jacket which has been introduced into pocket 14. As will be appreciated, ridges 86 help maintain the position of the spine of the jacket which has been introduced into pocket 14 by jacket feeder 10.

Figure 7A:
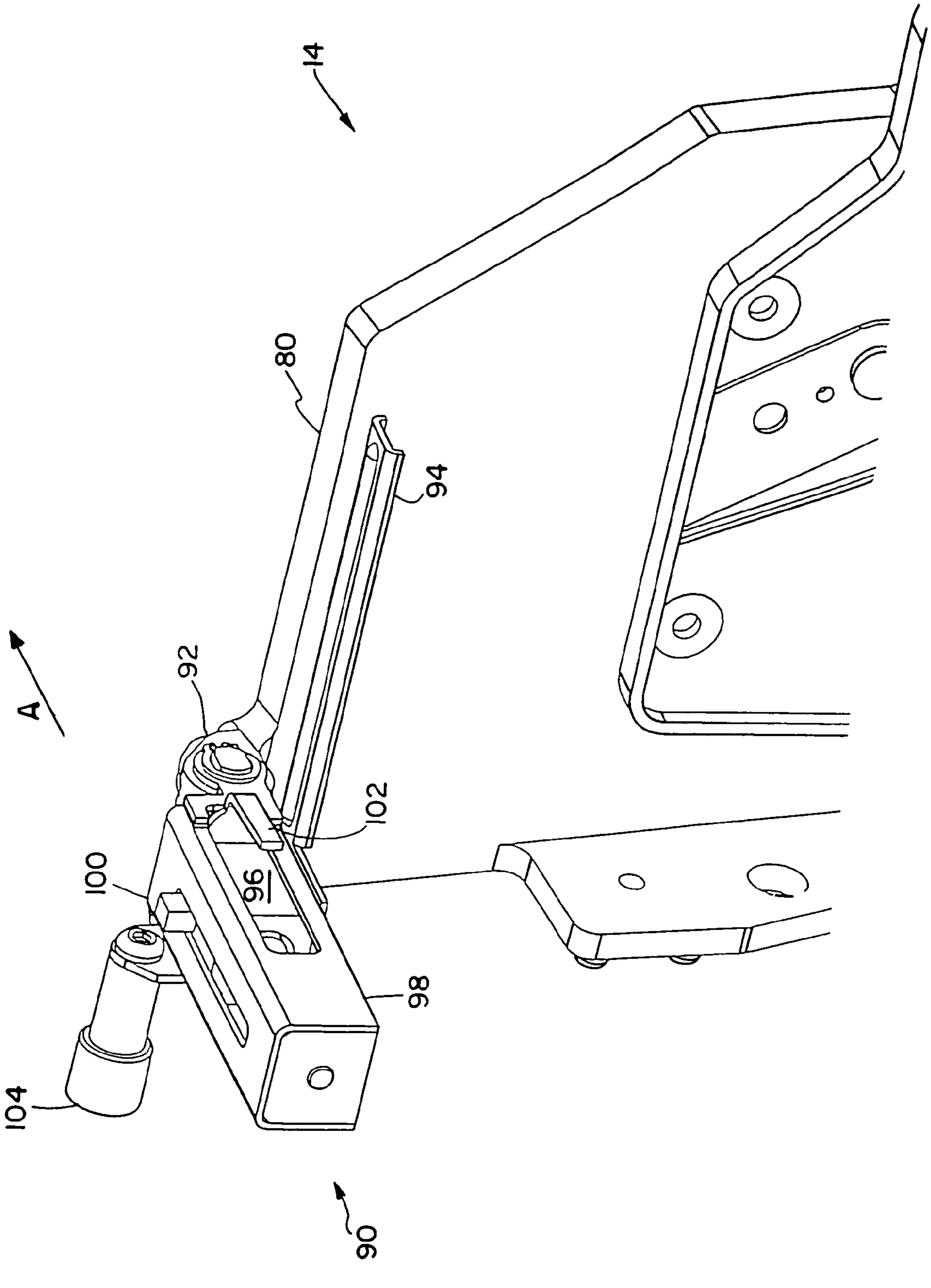
FIGS. 7A and 7B illustrate the adjustable pocket gripper of the present Invention.
Figure 7B:
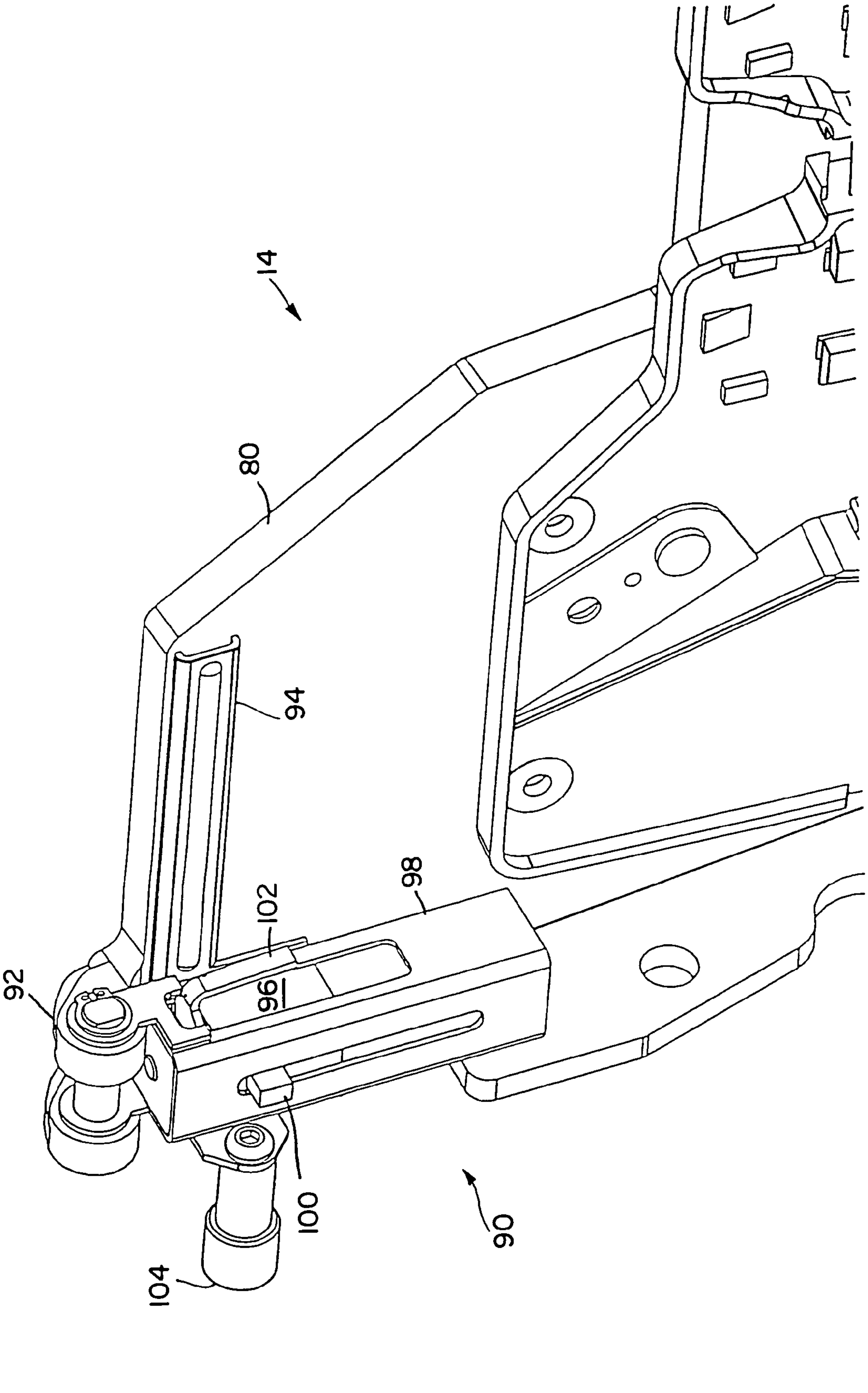

FIGS. 7A and 7B illustrate adjustable pocket gripper 90 of the present Invention. Adjustable pocket gripper 90 is attached to leading wall 80 of pocket 14. As illustrated in FIGS. 7A and 7B, adjustable pocket gripper 90 is attached by means of hinge 92 to leading wall 80. Adjustable pocket gripper comprises gripper bar 94 which is attached to car 96. Car 96 moves in housing 98. Car 96 is spring loaded in housing 98. Car protrusion 100 on car 96 is acted on to move car 96 in housing 98 between a plurality of stops. In order to release car 96 from any one of the stops and cause 96 to return to its rest position, the rest position being shown in FIG. 7B, latch 102 is acted on. Car 96 is spring biased to move to the rest position when latch 102 is acted on.

The operation of the adjustable gripper in FIGS. 7A and 7B is as follows. Housing 98 is moved to the horizontal position, as shown in FIG. 7A, by action of wheel 104 against a portion of the frame of the machine. Wheel 104 rides along a track in order to maintain housing 98 in a horizontal position while a finger presses down on latch 100 and moves latch 100 down the length of housing 98. Since latch 100 is attached to car 96, car 96 moves with latch 100. When the finger stops operating on latch 100, car 96 locks into one of the stops along housing 98. After the position of car 96 has been set, then gripper bar 94 has had its height adjusted. In order to release car 96 from its stopped position, wheel 104 is run on a track so as to move housing 98 into a horizontal position and a second finger operates on latch 102 to cause car 96 to move to its rest position, the rest position being shown in FIG. 7B. In this way, gripper bar 94 is adjusted to its new location. The movement of the pocket gripper in general is done in a conventional manner so as to grip a portion of the jacket which has been inserted into pocket 14.

Figure 8A:
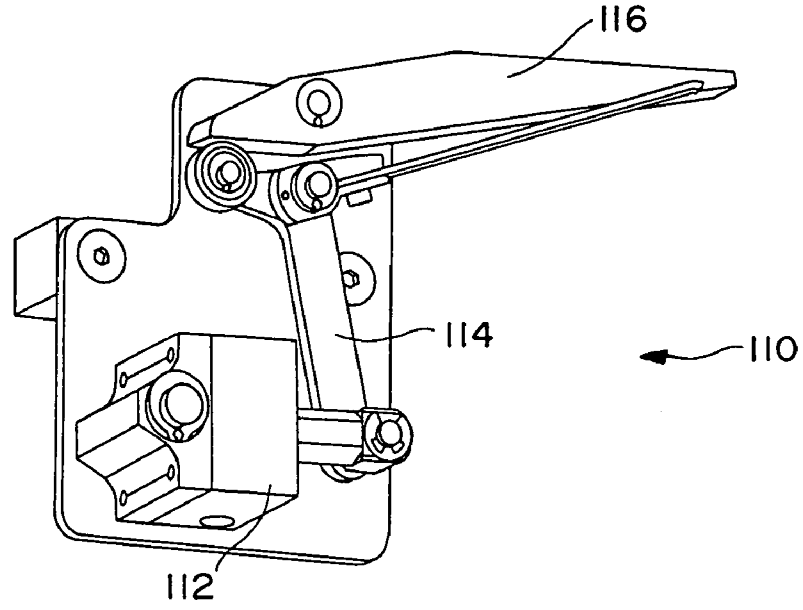
FIGS. 8A and 8B illustrate the pocket latch mechanism of the present Invention.
Figure 8B:
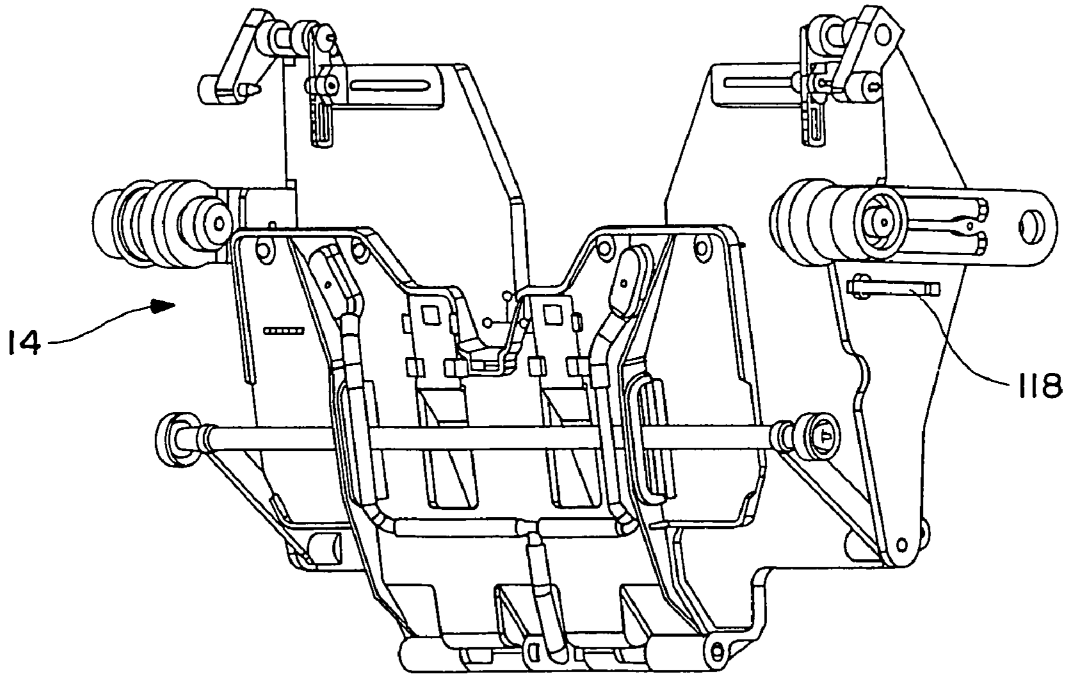

FIGS. 8A and 8B illustrate the latch mechanism of the present Invention. It is used in the "repair" operation in the event of a missed insert. As shown in FIG. 8A, trigger 110 is illustrated in its normal position. Piston 112, via arm 114, causing arm 116 to move back thereby causing arm 116 to move away from latch 118 which, in turn, allows latch 118 to activate and close pocket 14. Latch 118 is spring loaded. Trigger 110 is fixed on the frame of the insert machine just after product pick-up unit 18.

The missed insert repair system of the present Invention in conjunction with pocket latch will now be described. A conventional sensor is used to determine when there is a failure to insert flat material into an open jacket. This sensor detects when an insert has not been picked up by the feed drum or when there is a jam of inserts in the feed drum.

If the sensor detects either a jam in the feed drum or a missed insert in the feed drum, control computer 22 is notified and instructs all downstream insert feeds not to feed inserts into the incomplete pocket. The pocket is incomplete because one of the inserts was not fed into the pocket. The incomplete pocket remains open during its continued travel to the product pick-up unit. At the product pick-up unit, the incomplete pocket remains open. Because the incomplete pocket is open, the gripper of product pick-up unit cannot pick-up the product from pocket. Thus, the contents of the incomplete pocket remain in the pocket. Trigger 110 is integral with the frame of the machine, and positioned downstream of the product pick-up point. Control computer 22 instructs trigger 110 to activate latch 118 which is part of the pocket. Latch 118 causes the pocket to close after the product pick-up point and maintains the pocket in a closed position throughout the rest of its travel on the conveyor. The closed pocket continues on the conveyor until it has completed one complete cycle and arrives back at the feeder where the non-feed took place. At that point, latch 118 is reactivated so that the pocket opens and the missed insert can be fed into the pocket thereby correcting the error. Normally, the pocket is in an upside down and open position on its return trip from the pick-up unit to jacket feeder, to insure that the pocket is empty.

Preferably, each pocket is always open as it moves into position under a feeder. A decision on whether or not to feed an item into a particular pocket depends upon knowing what was previously fed into that pocket.

Figure 9B:
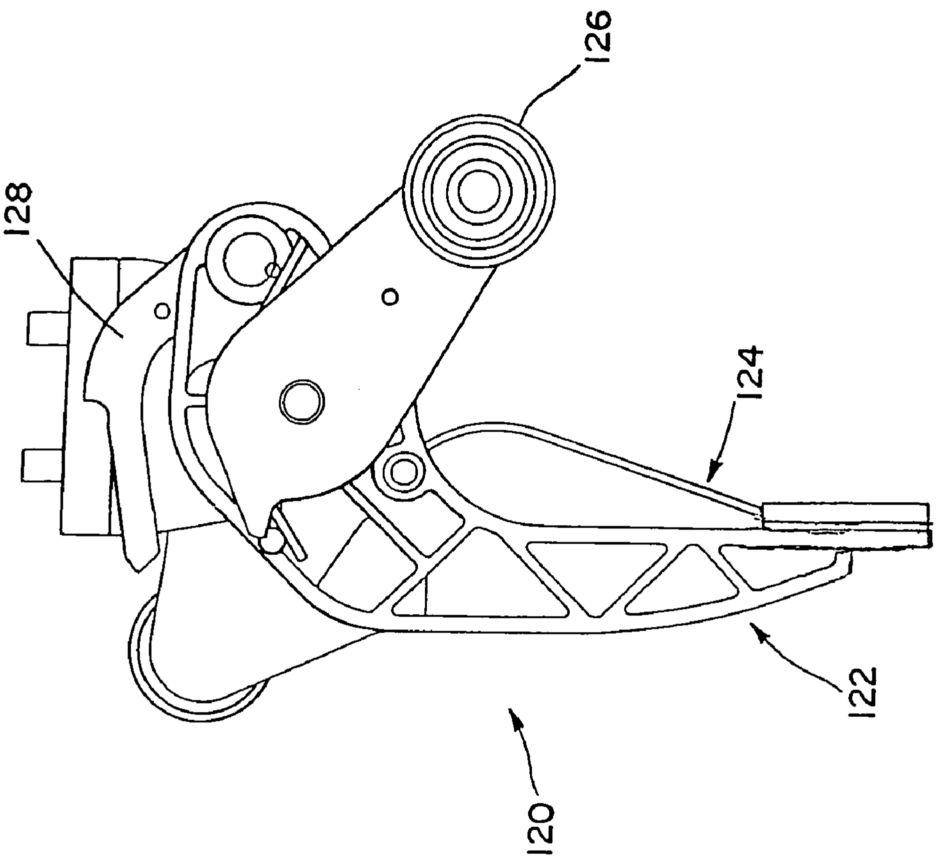
FIGS. 9A and 9B illustrate the overhead gripper conveyor of the present Invention.
Figure 9A:
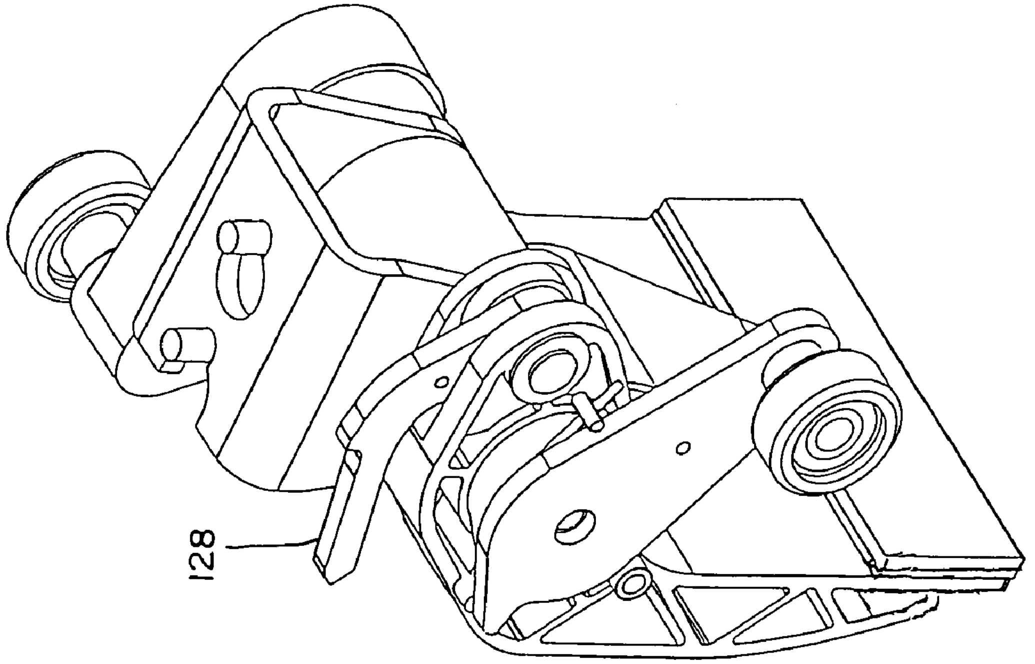

FIGS. 9 and 9A illustrate the overhead product gripper of the present Invention. As shown therein, product gripper 120 comprises a fixed plastic body 122 and a movable spiral spring 124. Spiral spring 124 is movable with respect to plastic body 122. The movement of spiral spring 124 is controlled by closing roller 126. The general operation of product gripper 120 and its configuration are conventional. The improvement, as taught herein, is the use of latch 128 which is affixed to the body of gripper 120. Latch 128 is acted on by a finger so as to press downward on latch 128 just prior to removal of the product from gripper 120. Latch 128 presses down on spiral spring 124 to release tension on closing roller 126 and thereby allow closing roller 126 to open gripper 120 and allow to facilitate the removal of the product from gripper 120.

Vacuum Control

Figure 10A:
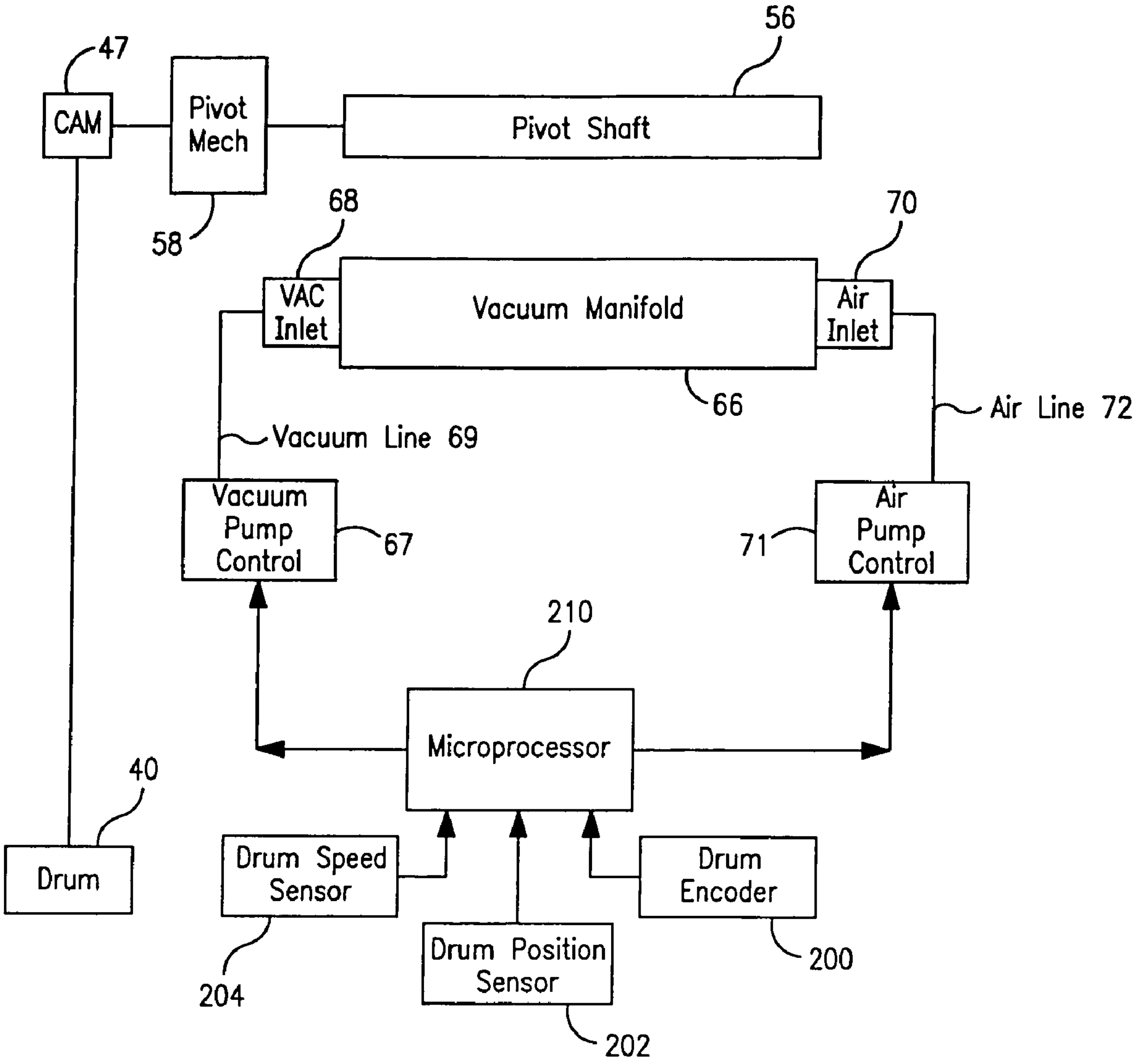
FIGS. 10A and 10B illustrate vacuum controls of the present Invention.

Another feature of the present invention is an electronic vacuum control system that provides a variable vacuum control for use in the feeder operations described previously. A block diagram of one embodiment of the vacuum control system is shown in FIG. 10A. Portions of the vacuum mechanism are also shown in FIGS. 4A and 4B. As previously discussed, a vacuum manifold 66 is provided adjacent to rotating drum 40 and to a sucker bar arrangement that pivots back and forth via a pivot shaft 56 operated by a pivot mechanism 58 and a cam 47 attached to the drum. As the drum rotates, a vacuum is periodically created in the manifold 66 through a vacuum inlet 68. After a brief interval, air is then blown into the manifold through an air inlet 70. This permits sucker cups 52 (FIG. 4A) to alternatively grab and release flat items such as a paper inserts from a stationary hopper area, for transfer to the moving drum.

A feature of the invention is that the drum does not always rotate at a constant angular velocity. For example, in the event of a misfeed or other handling problem, a control system (discussed below) is programmed to speed up or slow down the entire machine, including the drum, or make other adjustments. Thus, the timing and duration of the vacuum and air flows must be adjusted accordingly.

An electronic control system for accomplishing this is shown in FIG. 10A. A microprocessor or network controller 210, running under software control, is provided to alternatively operate a vacuum pump control 67 and an air pump control 71. Network controller 210 receives as inputs, and constantly monitors, signals from a drum encoder 200. Drum encoder 200 provides a rapid pulse stream to the controller as the drum rotates. In a preferred embodiment, a plurality of pulses per drum rotation are generated, to create a rapid pulse stream. A reference or index pulse is also supplied to the controller at least once per drum rotation.

Figure 10B:
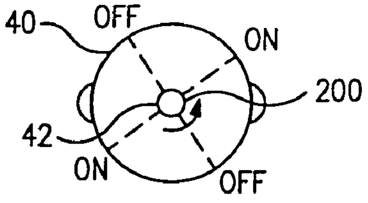

The drum encoder 200 is shown in more detail in FIG. 10B. It is a device fixedly attached to the drum shaft so as to rotate with the drum. A stationary reference or index point is also provided external to the drum. In one embodiment, as the drum rotates, the encoder rotates past a series of positions arranged around the circumference of the drum shaft, the positions representing "turn on" and "turn off" positions of the vacuum and air flows, respectively. In another embodiment, vacuum and air are under software control. In a preferred embodiment, there are two "on" positions and two "off" positions, arranged alternatively, approximately 90 degrees apart. Drum speed and angular position are calculated by a servo controller 210, which comprises software to provide both low-level motor control functionality and higher-level functionality. The software resides in a servo drive.

Alternatively, a separate drum speed sensor/encoder 204 may be provided to generate continuous (or rapidly periodic) signals to the controller representative of the rotational speed of the drum, and a separate drum position sensor/encoder 202 may be provided to generate continuous (or rapidly periodic) signals to the controller representative of the angular position of the drum.

The servo controller includes a servo control circuit board and a drive with a memory (not shown) that stores data (such as in a look-up table) representing optimal, predetermined starting, ending and duration times for the vacuum and air for a plurality of drum speeds. In the event the servo controller, monitoring signals from the drum speed sensor/encoder, detects a change in the rotational speed of the drum, the network controller automatically searches the data to locate the appropriate data entry for the new speed. Associated with that data entry are new vacuum and air timing (starting and ending), and vacuum and air duration, values for the new speed. The servo controller then automatically alters the timing of the vacuum signals and air signals sent to the vacuum and air pump controls accordingly. For example, if the drum has slowed by 10 percent, there will be an entry in the look-up table "telling" the servo controller to delay the starting and stopping of the vacuum and air by a certain time, and to change the duration of the vacuum and air flows, so as to compensate for the change in drum speed. The look-up table for the vacuum control can be pictured as follows:

| Drum Speed | Drum Angle to Start Vacuum | Drum Angle to Stop Vacuum |
|---|---|---|
| $N_1$ | $\theta\text{-}\Delta\theta_1$ | $\beta\text{-}\Delta\beta_1$ |
| $N_2$ | $\theta\text{-}\Delta\theta_2$ | $\beta\text{-}\Delta\beta_2$ |
| $N_3$ | $\theta\text{-}\Delta\theta_3$ | $\beta\text{-}\Delta\beta_3$ |
| . | | |
| . | | |
| . | | |

where:
θ = reference angle for start of vacuum (fixed)
β = reference angle for end of vacuum (fixed)
Δθ = angle from reference to start vacuum
Δβ = angle from reference to stop vacuum where:

θ=reference angle for start of vacuum (fixed)

β=reference angle for end of vacuum (fixed)

Δθ=angle from reference to start vacuum

Δβ=angle from reference to stop vacuum

An analogous table is also provided for the air control. In this way, accurate transfer of the inserts to the drum is maintained, and the through-put of the entire machine is optimized.

Overall Electronic Control System

Another important feature of the present invention is an all-electronic control system for automatically controlling the individual elements and operations of all components of the insert machine. A block diagram of one embodiment of this control system is shown in FIGS. 11A-11C.

Figure 11A:
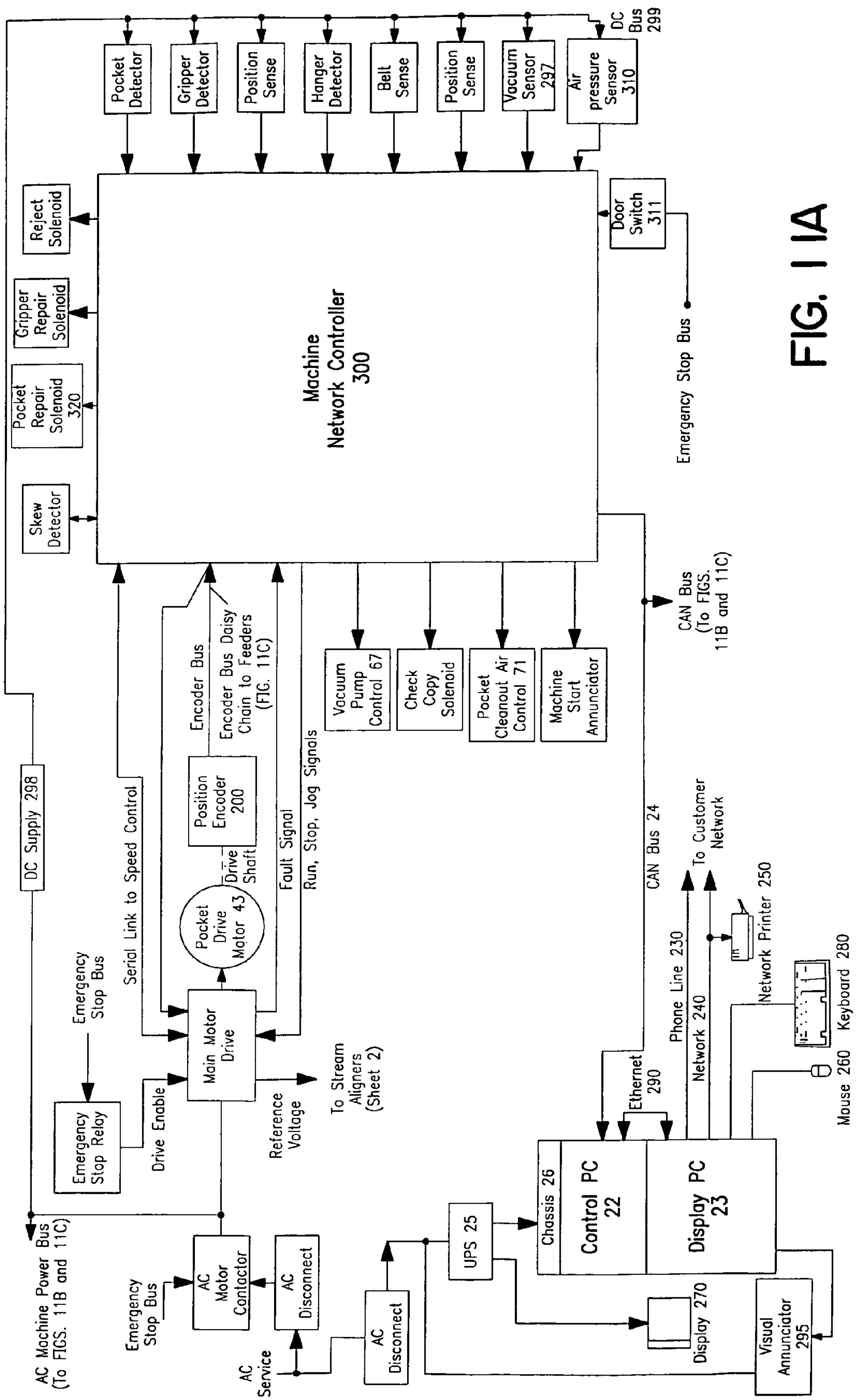
FIGS. 11A-11C are block diagrams which, taken together, illustrate the electronic control system of the present Invention.
Figure 11B:
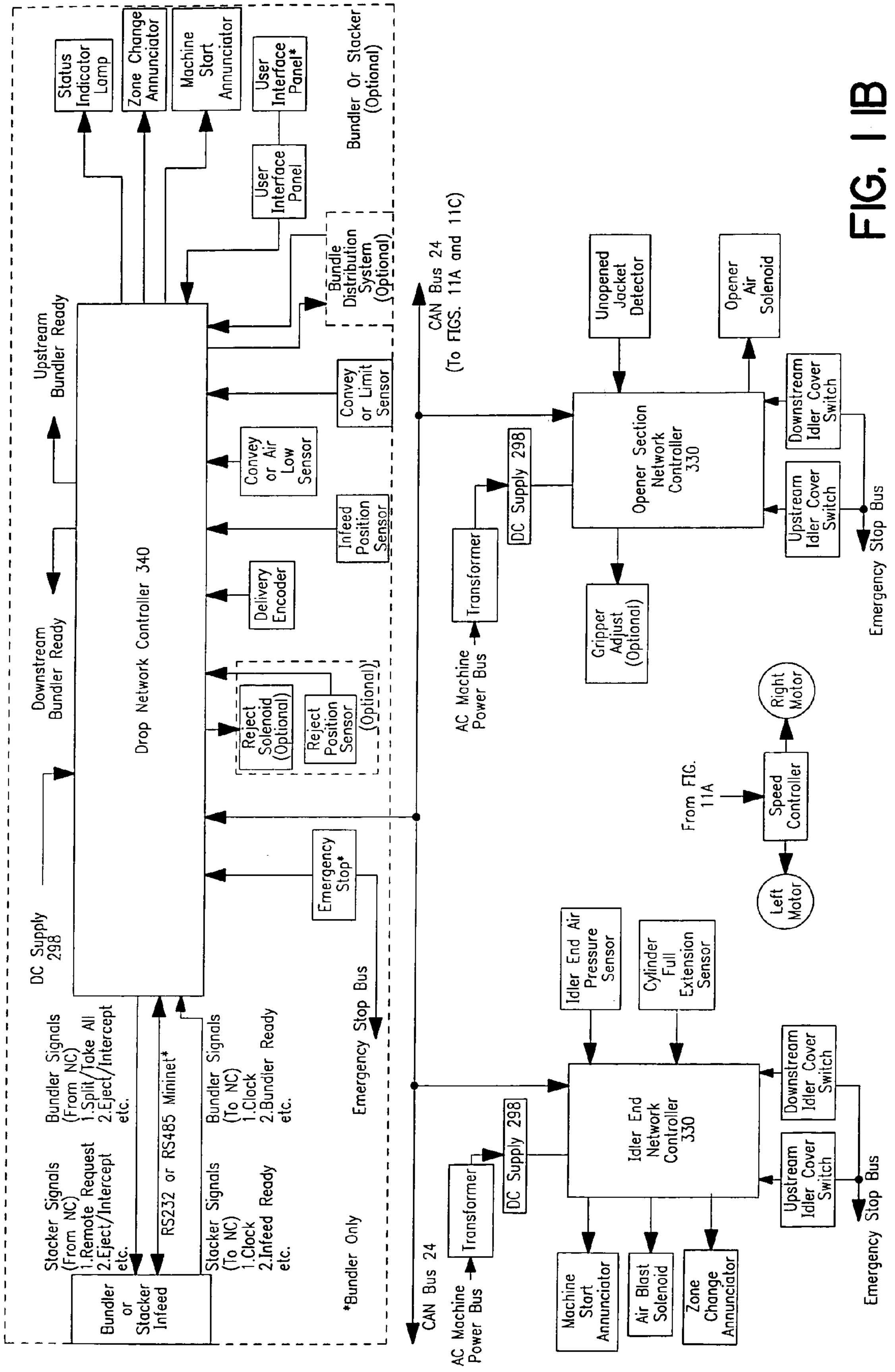
Figure 11C:
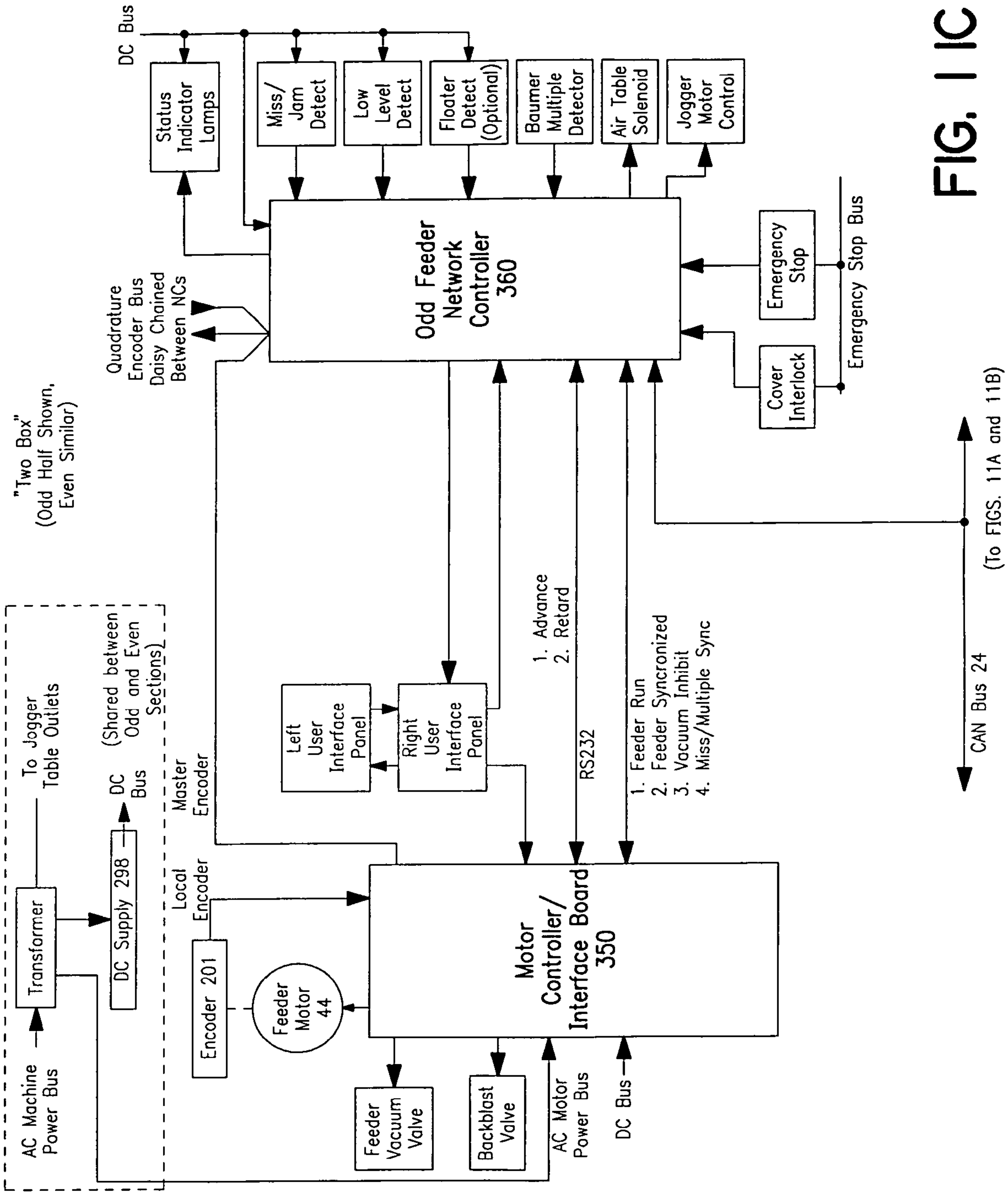

As seen in FIG. 11A, a central control computer 22 is provided. Control computer 22 may be a conventional personal computer with a Pentium or later class processor. It runs under a conventional operating system. Preferably, it also runs at least two proprietary machine control programs, programs called "WinLincs" and "MICA" (Main Inserter Control Application).

In a preferred embodiment, there is also a second computer, namely display computer 23, housed in a dual computer chassis 26 and coupled to control computer 22 via an ethernet link 290. Preferably, display computer 23 is also a conventional personal computer with a Pentium or later class processor running a conventional operating system and a plurality of proprietary and commercially available application programs.

In a preferred embodiment, the display computer provides a graphical user interface (GUI) for an operator to run the entire machine. For example, an operator can graphically set up the parameters for a machine "run", such as insert type and size, and run the entire machine.

The display computer (or user interface computer) 23 also has a connection to an external network that can be used to download production planning information to the system. The display computer performs some processing on information, and then sends it to the control computer, which performs additional processing on the information. The information is used, for example, to determine what inserts are put into a package, and what is done with the package (for example, whether to send the package to an optional external bundler or stacker).

Control computer 22 controls the overall operations of the machine, and display computer 23 provides the graphical user interface (GUI) to the user or operator. An uninterruptible power supply (UPS) 25 provides standard AC power to both computers. The UPS provides a status signal to the computers to allow them to automatically shut themselves off in the event that power is lost Display computer 23 has conventional peripherals such a keyboard 280, display screen 270 and a mouse 260, and is configured to communicate with an external network 240 and a network printer 250, and can connect to the Internet via a phone line 230 or through a local area network (not shown), which may be located at a customers site. In normal operation, control computer 22 does not have a display or other user interface, but has direct connections to controllers and other machine components and an auxiliary connection for optional connection to external machines such as bundlers or stackers.

In another feature of the invention, the control computer 22 is connected to a plurality of network controllers ("NC"), such as machine network controller 300 (FIG. 11A), via a bidirectional bus, preferably a controller area network (CAN) bus 24. This CAN bus is compliant with industry standard protocols, including ISO 11898 and 11519. Control computer 22 includes a CAN bus interface board to provide an interface. The CAN bus transmits data at high speed. Use of the CAN bus minimizes the number of connections required in the machine, and improves machine performance. In a preferred embodiment, the CAN bus has 128 nodes. More than one CAN bus may be provided, if desired.

Control computer 22 runs a main inserter control application (MICA) (discussed in more detail below), which is a proprietary program and preferably running under a commercially available operating system. The application runs in "soft" real time. The system is designed to provide control messages in a rapid and timely manner to the network controllers. For example, the control computer tells the machine what pocket to select for use at a particular time. Control messages sent over the CAN bus use standard CAN format, but the message content and bit definitions of the CAN messages are based on a proprietary protocol, discussed in more detail below.

Each network controller is a custom-designed microprocessor or microcontroller, preferably based on the Motorola 68000 family, and operating under software control. Each network controller runs a proprietary program, specific to each controller, written in the "C" language, with no operating system. A variety of network controllers may be employed. In this embodiment, the following network controllers are included: machine network controller 300 (FIG. 11A); idler end network controller 330 (FIG. 11B); opener section network controller 332 (FIG. 11B); optional drop network controller 340 (FIG. 11B); odd feeder network controller 360 (FIG. 11C); and an even feeder network controller (not shown).

Each network controller has a plurality of inputs for receiving electrical signals from sensors such as air pressure sensor 310 (FIG. 11A); detectors such as pocket detectors and gripper detectors; encoders such as encoder 200; switches such as door switch 311; and other devices; and control messages from the control computer 22. Each network controller also has a plurality of outputs for outputting machine control signals to individual machine elements such as solenoids (for example, pocket repair solenoid 320); controls such as vacuum pump control 67 and pocket cleanout air control 71; valves; annunciators or other visual displays; and other devices.

Each network controller is also preferably equipped with a memory (preferably a flash memory) that stores the program and setup data for that controller. New programs may be downloaded to selected network controllers. Software for all the network controllers resides on the control computer. The display computer can download software to the control computer. An advantage of this is to permit automated upgrades. The display computer is also configured to receive software updates that may be downloaded under remote control, such as over a customer network or the Internet.

Operation

Generally speaking, in operation, each network controller controls all input and output for the control of specific machine elements and operations taking place within a specific operational group or functional area of the machine, such as the vacuum control system, whereas the central control computer 22 controls the activation and deactivation of all network controllers by way of control messages, as well as the activation and deactivation of selected individual devices such a specific pockets. Using this architecture, which is a hybrid central/distributed architecture, the efficient real-time electronic control of all machine operations is achieved, which is a significant improvement over the prior art in that, for one thing, it reduces overall system cost.

The overall control system is based on the logical tracking of the contents of a "pocket" and what actions need be performed for a particular pocket. The control system logically references individual pockets until the finished "product" (newspaper plus inserts) leaves the machine. A typical pocket cycle will be described in more detail hereafter.

The control computer 22 is configured to send two different types of control messages to the network controllers and to other machine elements. One type is a "broadcast" message that is intended for all network controllers in the machine. The other type is an "individual" message that is intended for only one or a few network controllers or individual or local devices. In a feature of the invention, both types of messages can be sent over the same CAN bus. Each network controller "knows" whether an individual message is intended for it by reason of a unique protocol (described below) that is used for the messages. More particularly, a special addressing scheme is used whereby a single bit in the message is used to designate the specific network controller "targeted" by a given individual message.

The overall architecture of the control system of the invention permits hybrid central/distributed machine processing, with a central control computer 22 coupled to a plurality of network controllers via a CAN bus 24. In this embodiment (see FIGS. 11A-11C), several network controllers are employed, for example a machine network controller 300, an idler end network controller 330, an opener section network controller 332, an odd feeder network controller 360, an even feeder network controller (not shown) and a drop network controller 340 for use with an optional external bundler or stacker. In one embodiment, the controllers control every other feeder (odd and even) to increase speed.

Each network controller receives input signals from a plurality of sensors, detectors, switches and encoders, such as a vacuum sensor 297, air pressure sensor 310, drum position encoders 200 and 201 and miss/jam detectors. Each network controller also provides output control signals to a plurality of solenoids, valves, servo-amplifiers and other control devices, such as air blast solenoid 320, vacuum pump control 67, pocket cleanout air control 71 and motor controller 350. The network controllers, sensors, solenoids and control devices are preferably powered, for example, by a DC power supply 298 over a power bus 299.

One network controller, specifically the machine network controller 300 (FIG. 11A), is connected to a position quadrature encoder 200, and receives and processes the encoder's signals. The encoder is connected to the drive shaft of the pocket (drum) drive motor 43, and sends out timing messages (plus an index pulse once per rotation) based own the encoder's rotation. These timing messages are typically sent to all devices on the CAN bus. The timing messages are used by other devices, including network controllers and the control computer, to determine the exact physical position of elements of the machine. From this, other devices can send control signals and messages at appropriate times to control functions of the machine. There are numerous timing messages assigned for each pocket. The generation and use of timing messages in this manner is a significant feature of the invention. A typical pocket cycle sequence is provided hereafter.

Regarding the control messages, part of each message itself carries the address of a specific network controller or other device. Only a limited number of messages need be sent at a given time. This reduces the total number of messages required to operate the machine, and reduces the data transfer requirement on the bus. Several messages per pocket are sent to each feeder. The messages need to arrive at the feeders at different times.

In a feature of the Invention, the invention uses "soft addressing" to differentiate messages between individual and broadcast messages. This protocol permits the optimization of the utilization of bits in a CAN bus message. This reduces the number of messages required because more data may be provided in a particular message.

The protocol used for the control messages sent over the CAN bus is unique in several ways. First, all messages are received by all devices on the network. Based on a single bit in the message, each device determines if the message is a broadcast message or an individual message. Second, a message encodes either command information, which is intended to cause some activity at the receiving device, or status information, that indicates a condition or state. Third, some messages require the receiving device to send an acknowledgment message while others do not. Fourth, in broadcast messages, a particular bit field is used for the "Command," which specifies the action to be taken by the receiving device. Other bit fields may hold additional information for the receiving device. Fifth, depending on the job of an individual device, it may or may not perform any action in response to a broadcast message. Sixth, in an individual message, the same bit field used for the command in a broadcast message contains an address of the device, the recipient of the message. Other bit fields may hold additional information for the receiving device. Finally, individual messages are intended to cause an action by a single receiving device. However, is possible for other devices to "eavesdrop" on the messages. This capability is used, for example, to allow the control computer to "know" that a "stop" message has been sent from a feeder control network controller to the machine network controller so the control computer can cause the state to be displayed.

Machine cycling speed is calculated by an algorithm in a network controller, specifically the one that is connected to the encoder (machine/timing network controller 300, in FIG. 11B). The speed information is then sent in a message over the CAN Bus to the main inserter control application running on the control computer. The speed information is then sent to the display computer to be displayed.

There is also a commercially available annunciator 295 on the system that consists of an array of LEDs that can be lighted to display both textual and graphic information. The information can be displayed in various fonts, sizes and colors.

All messages are generated by one or more proprietary software application programs running in the display computer, the control computer or both. This application has multilingual capability, and generates message strings in the appropriate language. These messages are then sent to the visual annunciator.

The annunciator can be connected to the system in several ways. First, a serial connection to the control computer can be used. Text or graphic messages are sent either from the display computer or from the control computer. If the annunciator is connected to the control computer, then text or graphic messages are sent from the display computer to the control computer. The program in the control computer embeds the received message information into a message that is sent to the annunciator over a serial port. Multiple annunciators can be connected either to the control computer or to the display computer using either separate Com ports or a single Com port as a Multi-drop (RS_485) serial interface. Multiple annunciators can be addressed individually, and can display either the same or different information. One or more annunciators can be connected to the system via an Ethernet connection, using TCP/IP. The annunciators can be connected to either the control computer through a network port, or to the display through a network port. One or more annunciators can be connected on the same Ethernet network that connects the display computer and the control computer.

In another feature of the invention, considerable redundancy is provided. For example, if the control computer or display computer fails, the machine can continue to operate to complete a "run" at an acceptable speed.

Yet another feature of the invention is that the timing signals can dynamically change in real time between actions. Specifically, the system permits the dynamic changing of the timing of execution of the control messages. For example, if a reject gate device normally turns on at timing message 2 and turns off at timing message 10, the network controller can be told to change the timing so that the device turns on at message 0 and off at message 14. In addition, the speed of the entire machine may be dynamically adjusted in real time to optimize the throughput for the entire machine, based on measured insert performance. For example, speed may be adjusted if the line voltage changes or if the pockets or feeders are not operating correctly.

Another feature of the invention is that the presence of a product in a individual pocket may be detected using a sensor array such as a photocell and two reflectors (not shown) in a pocket. This permits the active diagnosis of machine operations in real time. For example, the system can automatically deactivate a specific pocket in real time if there is a misfeed or some other problem with that particular pocket. Remote diagnosis over a telephone line or over the Internet is also supported.

A more detailed description of specific components and features of one embodiment of the invention is provided below.

Machine Operating Modes

Normal (Full Functional) Mode

In this mode, all features and functions are available. The machine operator uses the software graphical User Interface to define and assign inserts, create packets, and define zones. This information is either entered manually or downloaded from a planning system. A Main Inserter Control Application (MICA), running on the Control Computer, sends messages to Network Controllers, distributed around the machine, to perform required functions. The Network Controllers interface directly with sensors and electrical actuators to actually control the machine. The machine runs the zones, putting inserts into jackets. Functions such as Repair, Backup, Stop on Multiple Miss, etc. will be selected by the operator. Overall Machine speed is controlled from the interface.

No Display Computer Mode (Redundancy Feature)

This is the mode that is in effect if the display computer or the software system fails, but the Control Computer and the Main Inserter Control Application is still functioning. If the display computer or WinLincs fails in the middle of a zone, the Main Inserter Control Application will use the information that it already has to finish the zone. If the machine is not running a zone, or the zone completes, the machine can then be operated from the Feeder Control Panels. The operator will put the Feeders that should be feeding into Auto mode. The Jacket Feeder is put in Off mode. When the Jacket Feeder is put in On or Auto mode, it will start feeding. As the jackets reach the downstream feeders, they will begin feeding. The machine will not feed into unopened jackets or empty pockets. The Run, Stop and Jog buttons, as well as the Emergency stop circuits will be functional. The machine will run at the default speed.

No Control Computer Mode ("Manual Mode")

This mode will be in effect if the Control Computer fails. In this mode, the Machine Network Controller will detect the loss of communications with the Control Computer, and send a message to the other Network Controllers indicating the mode change. The machine will run at default speed. Feeders that are in "AUTO" mode will switch to "ON" mode. All feeders will feed unless they are placed in "OFF" mode. It will be the operator's responsibility to turn feeders "ON" as a jacket reaches them. There will be no repair, skew detect, reject or other similar functions.

FURTHER DESCRIPTION OF CERTAIN COMPONENTS

Feeder Control System

Each feeder on the machine has a Network Controller. Typically, there are "even" feeders and "odd" feeders, with two feeders in a so called "two-box" frame that has two NCs. The NCs are powered from a DC supply in the two-box. Each feeder shares a motor controller with the other feeder in the two-box. There is a CAN Bus connection to each NC. There is a main machine encoder bus connection to each NC. Each NC is directly connected to the motor controller via discrete signal lines. Each feeder also has hardware for detecting misses, multiple feeds, jams, and other errors.

Network Controller Board

The Network Controller acts as the central point for all data flow and connections within the Feeder. It processes inputs from various detectors, the Motor Controller, User Interface Panels, Emergency Stops, the Cover Interlocks, and the Control Computer via the CAN Bus. It sends control outputs to the Status Indicator Lamps, Air Table solenoid, and Motor Controller. It sends data to the User Interface Panel and the Control Computer via the CAN Bus.

One of the Network Controllers in a two box has a serial connection to the Motor Controller. Through this connection, it has the ability to exchange setup data with the Motor Controller. There is a two-wire (differential) connection to the CAN Bus. An output is provided for the Air Table solenoid. Outputs are also provided for the Status Indicator Lamps. The board receives inputs from the Miss/Multiple Detector circuit, the Floater Detector, the Low Level Detector, the Miss/Jam Detector, two Emergency Stop switches, and the Cover Interlock switch.

WinLincs

WinLincs is a proprietary graphical user interface (GUI) program running under a commercial operating system. It provides the primary user interface to the machine. It provides the operator with the ability to create and runs zones, and to monitor production statistic and machine performance. It provides a variety of diagnostic and setup information and controls.

Main Inserter Control Application (MICA)-Architecture

MICA is a multi-threaded software application. There are six running threads, each handling specific functions. The threads are the CAN Receive Thread, CAN Send Thread, TCP Control Thread, Control Thread, Operation (Oper) Thread, and Download Thread. In addition, there is a Main Thread, which is responsible for starting the other threads and initializing the system. The threads functions independently and asynchronously.

Structures

There are several structures that are key to the functioning of The Main Inserter Control Application.

Position Array and Position Control Object

The Position Array is a large array, each element having two structures that correspond to a pocket and to a gripper.

Pointers in these structures provide a "handle" for accessing the information in the structures. The pointers also provide the mapping of the array elements to the physical pockets and grippers. The Position Control Object provides a mechanism to indirectly access the Position Array using the pointers, based on a position or location on the machine. There is a correspondence between each of the elements of the array and a physical location on the machine. The structures in an array element contain information pertaining to the product that is in the pocket or gripper at a location. This information consists of general information, such as the zone that the product belongs to, data necessary to produce the product, such as the required inserts, status information, such as the inserts that have been inserted up to that instant, and disposition information, such as if the product will be Rejected or Repaired. It also contains the physical number of the pocket and gripper that will contain the product. The array is large enough to handle all the pockets and grippers from the longest machine.

Element 800 of the array corresponds to a location slightly beyond the Pickup area. This location is the same for all machines. All access to the array elements is indirect, via pointers. As the Inserter cycles, and product moves through the machine, the pointers to the array are shifted to imitate the shifting of data, without having to copy the data from one element to the next. At about the time that the product is physically transferred from the pocket to a gripper, the data in the pocket portion of the array is copied to the gripper portion. It is necessary to provide for separate storage in each array element for pocket and gripper information primarily to allow for Repair, particularly because the number of pockets and grippers varies from machine to machine.

There are several other key mechanisms that allow the Position Array to function properly. First is Synchronization. Because it cannot be predicted if a First Gripper detection or First Pocket detection will be occur first, the software was written to handle either case. As soon as both the First Pocket and First Gripper are detected, the application correctly determines the correspondence between the number of the physical pocket, and the number of the physical gripper that will remove the product from that pocket. The second key mechanism is the Position Shifter functionality.

This function performs several tasks. The first task happens on a pocket that reaches the Pickup area of the Inserter, and is performed on the array element corresponding to the pocket. The function determines if the product in the pocket will be repaired. Based on the determination, it copies appropriate data from the pocket section of the element to the gripper section, and clears other data. For example, if a product will be repaired, the information on the inserts that have already been fed would not be cleared. If the product is not being repaired, all data would be copied to the gripper area, and the pocket portion would be reinitialized.

The second task is to shift the pointers in the elements in the array. This mimics the effect of shifting all the data from one element to the next, but is more efficient The data is always accessed indirectly, so it is not necessary to actually shift the data.

The third task is handling the rollover of the pockets and grippers. The physical pockets and grippers on the Inserter are in loops, so, just as they cycle back around through the Inserter, the corresponding pointers must re-circulate.

The fourth task is resetting the correspondence of the pockets and grippers. Because the number of pockets and grippers varies from Inserter to Inserter, and the number of grippers may be either greater or less than the number of pockets (or, in rare cases, the same), a calculation must be performed each cycle to determine the number of the gripper that will receive the product from a particular pocket.

Task Table—The Task Table contains pointers to the software tasks that are performed at various times throughout the pocket cycle. It is described elsewhere.

WinLincs Data—Data being sent bi-directionally between WinLincs and the Main Inserter Control Application is stored in various structures. Each structure is specific to the data that it contains. The structures are passed between the two systems in message that is a union of the various structures.

Zone Data—Information for each zone being produced is stored in Zone Data structures. This data is sent from WinLincs, and is used by the Main Inserter Control Application to determine how to produce products. Types of information include the specific inserts required for the product, how many to produce, and delivery information such as the number of pieces in each bundle. In addition to information that is common to all products in the zone, piece specific information, such as an address, may also be included.

Machine Configuration

The Machine Configuration structure contains information that describes the particular Inserter. For example, it would contain the number of feeders and deliveries on the Inserter. At system startup, this information is retrieved from a file stored on a drive in the Control Computer. A user can change this information through the WinLincs 4 user interface. If a change occurs, the new configuration it is sent from WinLincs 4 to the MICA. It is then immediately stored in the file on the disk. This allows the MICA to start up with a valid configuration for the Inserter even if WinLincs 4 fails to start for some unknown reason.

Tasks

The following is a partial list of tasks that would be operational on a typical Inserter. The exact number and type of tasks varies with the Inserter's configuration. There are two types of tasks. Real Device tasks relate to physical devices on the Inserter, for example, a Reject mechanism. Virtual Device tasks relate to pure software functions that are not specifically associated with any devices on the machine. An example would be the Pocket Loader, which writes information into the Position Array. There are also tasks for controlling Feeders and Deliveries, and for keeping track of Network Controllers.

Real Device Tasks—Some examples of Real Device tasks would be:

Pocket One Task—Processes the First Pocket Detected message.

Gripper One Task—Processes the First Gripper Detected message.

UOJ Task—Processed the Unopened Jacket Detection message.

Pickup Task—Handle the transfer of data from the pocket structures to the gripper structures.

Pocket Repair Task—Requests Pocket Repair solenoid actuation

Gripper Repair Task—Requests Gripper Repair solenoid actuation.

Reject Task—Requests actuation of the Reject mechanism.

Skew Task—Processed the Skew Detection message.

Check Copy Task—Requests actuation of the Check Copy mechanism.

Cleanout Air Task—Requests actuation of the Cleanout Air solenoid valve.

Virtual Device Tasks—Some examples of Virtual Device tasks would be:

Pocket Loader Task—Loads some data into a pocket structure in the Position Array.

Pocket Inserts Loader Task—Loads insert data into a pocket structure in the Position Array. This is done after the Unopened Jacket Detector.

Miscellaneous Machine Control Task—Handles determine which Emergency Stop button has been pushed and if any Feeders have been started or stopped.

Theory of Operation

Startup—At startup, all required memory is allocated, all variables and structures and classes initialized, and all threads started. The inserter configuration information is retrieved from a file, and the Task Table is loaded. Note that the configuration information determines the exact contents of the Task Table. After appropriate time delays, the TCP and CAN communications are started. Status information is collected from the Network Controllers and sent to WinLincs 4.

The Inserter is cycled, and eventually, the First Gripper and the First Pocket will be detected, and this information sent to MICA. After both have been detected, the Position Array is initialized and MICA begins processing Timing messages received on the CAN Bus, using the Task Table to determine which tasks to perform.

As the Inserter is cycled, MICA send messages on the CAN Bus to Network Controllers to control various functions. Examples include requesting the Reject mechanism to operate, turning a feeder On, or requesting a feeder to feed a piece. MICA also receives CAN messages from Network Controllers that provide status information about the Inserter and its operation. Examples would include detecting that an Emergency Stop button was pressed, receiving notification of a successful feed from a feeder, or a message indicating a delivery device had been turned Off. MICA will properly act on this information, and if appropriate, pass the information on to WinLincs 4 so that it can be displayed to the user. A key feature is that status data indicating if a Feeder successfully fed a piece is sent to MICA and stored in a timely enough manner that the data may be used to control the feeding of the next Feeder on the Inserter. MICA also receives configuration and control messages from WinLincs 4. Examples would include changing the configuration of the Deliveries, a request to change the Inserter's speed, and a request to initiate inserting and begin producing a zone.

Generally, MICA sends only a single control message on the CAN Bus to a Network Controller to cause a specific control action to occur. This would be sent only once per pocket cycle, and would occur before the control action is required. It is not time critical. Prior to the control message, information would be sent from MICA to the Network Controller via the CAN Bus telling the Network Controller how to handle the control message. The Network Controller would initiate the control action at the required time, and terminate the action, if required, at the appropriate time. For example, MICA would send a Network Controller the Start time and End time for control of a Reject mechanism. Some time before the Start time, Mica would send a control message to the Network Controller, requesting it to actuate the Reject mechanism. When the Network Controller received the Timing message on the CAN Bus corresponding to the Start time, it would control an output circuit connected to the Reject mechanism. When the Timing message corresponding to the End time was received, the Network Controller would deactivate the output to the Reject mechanism. In some cases, the control message from MICA may contain information telling the Network Controller to start operation of a device at the Start time, but not to end operation of the device at the normal End time. This causes the device to remain actuated for the next pocket or gripper. During this subsequent time, another control message from MICA would be sent, requesting either to terminating the control at the normal End time or continuation into the next pocket. This allows devices such as solenoids to remain activated for multiple pockets or grippers, rather than actuating and de-actuating for each pocket when their activation is required for several sequential pockets or grippers. This reduces noise and reduces wear on the devices.

Once the Inserter is properly setup and synchronized, WinLincs 4 may sent a Zone Start request. The Pocket Loader task will begin to put data into the structures in contained in the Position Array. As the Inserter cycles, the information stored in the Position Array "shifts" as the corresponding physical gripper and pocket move down the Inserter. Various tasks read information from the Position Array, based on a predetermined location for each task. That is, each task is associated with a location on the machine, and it reads the information from the Position Array as the physical pocket moves into the location. The task uses the information from the Position Array, plus general configuration and Zone information to determine what action to take. For example, a Feeder Control Task may look at the information for a pocket to determine if it should feed an insert into that pocket. It could also use status information, such as whether or not a previous feeder had missed a feed, along with general information, such as if Repair was turned on, to modify the decision to feed. This procedure is generally typical for most tasks on the machine. In a similar manner to the control of the Feeder for a particular pocket, control decisions for a product continue to be made as it transitions from pocket to gripper, and eventually to the delivery of the Inserter. All information related to the contents of a particular pocket or gripper is stored in the Position Array in the element corresponding to the pocket or gripper.

In addition to sending CAN Bus messages to Network Controller to effect control of the Inserter, MICA also collects information for status and diagnostics needs. For example, data provided from MICA and displayed on WinLincs 4 allows an operator to view information showing the eventual disposition of a piece, whether it will be rejected or sent to a Delivery device.

The MICA software can be reloaded on the Control Computer from WinLincs 4. This provides a mechanism to update the Control Computer with a new version of MICA without having to directly access the Control Computer. Also, a similar mechanism allows MICA to Down Load new software versions to the Network Controllers on the Inserter, from files stored on the WinLincs 4 computer. The Network Controllers can then be restarted and begin executing the new software. This allows the Network Controllers to be reprogrammed without being physically accessed. This taken in conjunction with the ability to remotely access (via the Internet) WinLincs 4, allows a remote technician to completely reprogram the machine without any manual intervention at the Inserter itself.

Typical Pocket Cycle

This section describes the major actions that take place during a typical pocket cycle of the Inserter of the present invention. In one embodiment, a pocket cycle is defined as the occurrence of 32 Timing messages. These messages are generally referred to as Timing Message 0 to Timing Message 31, the "times" referred to as Time 0 to Time 31. The timing messages are derived from the Main Machine Encoder, and correspond to the movement of the pocket chain through the length of one pocket, or six inches. The spacing of the gripper chain is the same as the pocket chain, and they move synchronously, so the same timing is common to both. A procedure is performed on the Inserter to synchronize the Timing Messages with the machine by defining Time 0 as occurring when a specific point on a pocket reaches a specific location on the machine. Although this description starts at Time 0 and progresses, it should be remembered that this is a continuous process, and that actions can span through Time 0. Note that the "pocket cycle" for a specific device should be viewed relative to the device and its exact physical location on the machine.

For example, a Reject mechanism consists of a cam actuated by a solenoid that is fastened at a specific location on the machine. It opens the gripper by acting on a roller mounted on an arm on the gripper. From the perspective of the Reject, the cycle for a particular gripper may be thought of as starting when the roller of the preceding gripper leaves the cam, past the point where the roller of the gripper in question reaches the cam, to the point when the gripper's roller leaves the cam. The Timing message that defines the start of this cycle depends on exactly where on the Inserter the Reject mechanism is located.

Note: Many things are happening to many pockets and devices simultaneously on the Inserter. Also note: the times at which events in this example occurs are not necessarily the same for any other Inserter.

Example Typical Pocket Cycle for a A16 into 1" Inserter, Two Deliveries in Split Mode.

Time 0—Message sent from MICA to Drop 1 Network Controller (NC) requesting it to accept the next paper.*

Time 1—No action occurs.

Time 2—The Position Shifter logically shifts the data for the pockets and grippers by one position in the Position Array.

Time 3—Message sent to Machine NC to actuate Pocket Repair for Pocket 5.* Feeder 2, 6 and Jacket A feed, requested last cycle.

Time 4—Broadcast message from MICA sent to Feeder NCs 3, 7, 15 to feed, and Feeder 111 to inhibit.* Feeder 14 feeds, requested last cycle. Feed status messages from Feeders 3, 7, 11, 15 received. These statuses are for the feeds that were requested two pocket cycles previously.*

Time 5—Message sent from Mica requesting the Reject mechanism to actuate.* Feeder 10 feeds, requested last cycle.

Time 6—Machine NC actuates Pocket Repair solenoid.* Paper taken by Delivery 1.

Time 7—Message sent to Machine NC to actuate Gripper Repair Solenoid for Gripper 113 (Pocket 7).*

Time 8—No action occurs.

Time 9—Machine NC actuates Gripper Repair solenoid.* Check Copy request received from WinLincs.

Time 10—Machine NC activates Reject Solenoid.*

Time 11—No action occurs.

Time 12—Broadcast message from MICA to Feeder NCs 2, 6, 10, 14, and Jacket A to feed.* Feed status messages from Feeders 2, 6, 10, 14, and Jacket A received. These statuses are for the feeds that were requested two pocket cycles previously.*

Time 13—Check Copy request sent to Machine NC.* Feeders 5 and 9 Feed, requested last cycle.

Time 14—Message sent from MICA to Drop 2 Network Controller (NC) requesting it to accept the next paper.* Feeders 1 and 13 Feed, requested last cycle.

Time 15—First Pocket Detected message sent by Machine NC.

Time 16—Paper taken by Delivery 2.

Time 17—Upstream Unopened Jacket Sensor detects Open. Opener NC send message to MICA.

Time 18—Machine NC de-activates Reject Solenoid.*

Time 19—Downstream Unopened Jacket Sensor detects Open. Opener NC send message to MICA. Feeder 12 feeds, requested last cycle.

Time 20—Broadcast message from MICA sent to Feeder NCs 1, 5, 9, 13 to feed.* Feeder 4 feeds, requested last cycle. Feed status messages from Feeders 1, 5, 9, 13 received. These statuses are for the feeds that were requested two pocket cycles previously.*

Time 21—Machine NC de-activates Pocket Repair solenoid.* Feeder 8 feeds, requested last cycle. Feeder 16 inhibits.

Time 22—Unopened Jacket task writes "Unopened" bit into Position Array for pocket 78.*

Time 23—Message from Feeder 8 to Machine NC—Stop Button pushed. Message from Machine NC acknowledging Stop Button. Machine NC sends command to Main Drive requesting the Inserter stop. MICA sends message to WinLincs 4 to display a Stop at Feeder 8.

Time 24—No action occurs.

Time 25—First Pocket message processed by MICA.*

Time 26—Machine NC de-activates Gripper Repair solenoid.*

Time 27—No action occurs.

Time 28—Broadcast message from MICA sent to Feeder NCs 4, 8, 12, 16 to feed.* Feed status messages from Feeders 4, 8, 12, 16 received. These statuses are for the feeds that were requested two pocket cycles previously.* Drive stops, machine continues to coast. Feeder 3 feeds piece, requested this cycle.

Time 29—Machine NC actuates Check Copy mechanism (De-actuates during next cycle.)* Feeder 11 inhibits, requested this cycle.

Time 30—Feeders 7 and 15 feed pieces, requested this cycle.

Time 31—No action occurs.

* Action occurs synchronously with the Timing Message, all other action are asynchronous.

Task Table Description

The Task Table is a dynamic software mechanism based on a C++ class, in the MICA software, for allowing various control functions to execute at specific times in a pocket cycle. It provides a structure that allows the point (time) in a pocket cycle for a task to be performed to be set easily and in a standard fashion, for this time to be changed dynamically, and for multiple tasks to be preformed at the same point in a pocket cycle without interfering with or requiring the modification of other tasks. The Table also insures that data in the system is processed in a controlled, sequential manor, and that functions are executed in a specific, sequential order. A task take the form of a software function, which is called will optional parameters.

In one embodiment, there are approximately 32 Timing messages generated by the Machine Network Controller for every 6 inches (one pocket length) of movement of the pocket chain. These messages are sent over the CAN Bus and are received by the Control Computer, which is running MICA. The Machine NC uses an encoder to determine the movement of the pocket chain, and generates the messages based on encoder counts, so that they are evenly spaced. The messages are numbered from 0 to 31. When the Control Computer receives a message over the CAN Bus, it is processed by MICA, and appropriate software tasks for that "time" are executed.

The Task Table Class contains the Task Table array, a two dimensional array of structures of type TASK_ENTRY. Each TASK_ENTRY element consists of a Device Number (Dev_Num), which is the real or logical device that the task is performed for, a Task Number (Task_Num), which is used for Table maintenance, a pointer (Task_Param_Ptr) to the function (task) which is to be executed, and a pointer (Passed_Param_Ptr) to an optional list of parameters for the task.

One dimension of the array holds the structures for all the tasks that will occur at a particular time. There is an arbitrary maximum (specified by a parameter) of 20 tasks that can occur for a particular timing message. The other dimension specifies the "time" that the task will be performed.

The total size of the table is 640 (32×20) elements.

The Task Table Class also contains several variables that contain counts that are used for table maintenance.

There are five Methods or functions for the Task Table Class. They are: Register_Task, Delete_Task, Compress_Table, Get_Table_Entry, and Get_Task_Count. Register_Task adds a task into the Task Table. The time for the task to execute, and a pointer to the task function are key parameters. Delete_Task removes a task from the Task Table. Compress_Table is a utility function that moves elements in the Table after a task is deleted. Its purpose is to insure that all tasks for any specific time are adjacent in the Table. Get_Table_Entry returns the information for task From the Table. This information is then used to execute the actual task function by means of an indirect function call using the Task_Param_Ptr. Get_Task_Count returns the number of tasks for a particular time.

The Task Table is used as follows: On startup, tasks are loaded via Register_Task in the Task table. The list of tasks, and their execution "times" (i.e. the timing message when they execute) are either specified in MICA by a configuration file previously generated through the User Interface, or are "hard coded." When a timing messages is received by the Control Computer via the CAN Bus, the message is parsed to determine the "time." The Get_Task_Count function returns the number of tasks for that time. Get_Table_Entry is called repeatedly, depending on the number of tasks. Note that it is possible that there may be no tasks for a particular time. Each time Get_Table_Entry is called, the task for the entry is executed. These tasks typically either involve processing data based on flags that may have been set previously, or sending a message on the CAN Bus to one or more NCs. If the user changes the machine's configuration via the User Interface, the number or timing of tasks may change. If the timing for a task is changed, the existing task entry is first deleted from the Table. The Table is then compressed, and the task added back in at the new time using Register_Task. The added task becomes the last task executed for the time. Note that our usage rules specify that no two tasks with any dependency on each other (either directly in the code or through an external device) can be executed at the same task time. For example, assume there is a task that executes at "Time 2" and sends a message to an NC to cause a device to actuate. It would be improper to also query the status of the device at "Time 2," since it may not be possible to determine which of the two tasks would be executed first, leading to unpredictable results.

CAN Message Structure

This section contains an explanation of the CAN message structure for the present invention.

As previously discussed, a typical system will consist of a Control Computer (CC), Network Controllers (NCs) for feeders, and NCs for other devices. It is possible to have multiple CCs in the network, although this is not the common implementation. The CC will send messages to the NCs and the NCs will send messages to the CC, but NCs will not communicate with other NCs. There are two exception: The first exception is the Timing NC. It will send broadcast messages containing timing information to all CCs and NCs. The second exception is the Run, Stop, Jog command. This is sent from a Feeder or Drop NC to the Machine NC. The Run, Stop, Jog command is also received by the Control Computer. If there is more than one CC in the system, the CCs will communicate with each other.

Normal transmissions will be of 6 types:

1. Broadcast messages from the CC to multiple NCs.
2. Messages from the CC to an individual NC.
3. Expected or Requested responses from the NCs to the CC
4. Asynchronous messages from the NCs to the CC (e.g. E-stop indication)
5. Broadcast messages from the Timing NC to all devices.
6. Run, Stop, Jog commands from Feeder and Drop NCs to the Machine NC and CC.

Messages are split into two classes, Individual Messages and Broadcast Messages. Individual messages are sent by one device to another device. All devices receive the message, and then look at the address portion of the identifier field to determine if it matches the address of that particular device. If the address does not match, the message is ignored. Broadcast messages are for groups of devices. Each device examines the command portion to determine if the message applies to them.

The CAN protocol specifies a combined Address/Priority identifier for each message. Each device on the CAN bus has an address which is compared with incoming messages. There is also a mask register that specifies the bits of the address that will be tested. If the bits of the device's address, specified by mask register, match the corresponding bits of the incoming message, the message will be received. Otherwise, the message is ignored. The same identifier field of the message is used to determine message priority for collision avoidance. In CAN, the lower the value of the identifier, the higher the priority of the message. For the present invention, all the mask register is not used. All devices receive all messages, and are responsible for determining if the message is applicable for the particular device. In addition to identifier portion, the message will contain from zero to eight data bytes. These bytes can contain a variety of information, depending on the particular message being sent.

Bytes are defined as: |Byte 0|Byte 1| Bits are numbered in a similar manner, with the least significant bit of Byte 1 being Bit 0.

Since only 11 bits are used in a CAN address, the five leftmost bits of Byte 1 are unused or "Don't Cares." Therefore, the value range is:

| | $b_{15}$ $b_8$ | $b_7$ $b_0$ | |
|---|---|---|---|
| From | 00000000 | 00000000 | 0x0000 |
| To | 00000111 | 11111111 | 0x07ff |

for 2048 distinct values.

TABLE 1

Identifier, Individual Messages

| Bits | Function |
|---|---|
| $b_{15}$-$b_{11}$ | Don't Care (Unused) |
| $b_{10}$ | Priority0 |

TABLE 1-continued

Identifier, Individual Messages

| Bits | Function |
|---|---|
| $b_9$ | Priority1 |
| $b_8$ | Broadcast/Individual |
| $b_7$ | Spare |
| $b_6$ | Address6 |
| $b_5$ | Address5 |
| $b_4$ | Address4 |
| $b_3$ | Address3 |
| $b_2$ | Address2 |
| $b_1$ | Address1 |
| $b_0$ | Address0 |

TABLE 2

Identifier, Broadcast Messages

| Bits | Function |
|---|---|
| $b_{15}$-$b_{11}$ | Don't Care (Unused) |
| $b_{10}$ | Priority0 |
| $b_9$ | Priority1 |
| $b_8$ | Broadcast/Individual |
| $b_7$ | Spare |
| $b_6$ | Spare |
| $b_5$ | Spare |
| $b_4$ | Command4 |
| $b_3$ | Command3 |
| $b_2$ | Command2 |
| $b_1$ | Command1 |
| $b_0$ | Command0 |

TABLE 3

Data, Individual Messages

| Bytes | Function |
|---|---|
| $byte_0$ | Sequence Number |
| $byte_1$ | Message Number |
| $byte_2$ | Data 2 |
| $byte_3$ | Data 3 |
| $byte_4$ | Data 4 |
| $byte_5$ | Data 5 |
| $byte_6$ | Data 6 |
| $byte_7$ | Data 7 |

TABLE 4

Data, Broadcast Messages

| Bytes | Function |
|---|---|
| $byte_0$ | Sequence Number |
| $byte_1$ | Source Address |
| $byte_2$ | Data 2 |
| $byte_3$ | Data 3 |
| $byte_4$ | Data 4 |
| $byte_5$ | Data 5 |
| $byte_6$ | Data 6 |
| $byte_7$ | Data 7 |

Details:

Identifier, Individual Messages $b_{10}$-$b_9$ Priority bits—These are used to specify the priority of the message. They are used to insure that important messages get through immediately. Code "00" has the highest priority.

$b_8$ Broadcast/Individual—Defines the class of the message. When this bit is "0" the message is an Individual Message.

$b_7$ Address Specifier—Set to '1' for messages sent from an NC to the Control Computer, '0' otherwise. Because several NCs may simultaneously respond to a Broadcast message from the Control Computer, a means of distinguishing the messages is required. When this bit is set to '1', the Address is the address of the NC sending the messages, and the destination is defined to be the Control Computer. This makes the Identifier for each of these messages unique. In all other messages, the Address is the address of the destination NC.

$b_6$-$b_0$ Address—There are 128 possible address for devices. Addresses 64 through 127 are reserved for the feeder NCs. Addresses 8 through 63 are reserved for non-feeder NCs. Address 8 is the Timing NC. Address 9 is the Machine NC. Address 10 is the Idler End NC. Address 111 is the Opener NC. The addresses for the Drop NCs start with Address 12. Addresses 0 through 7 are for CCs. Note that these addresses refer to the functionality of the NC, not a specific piece of hardware. A single NC may have more than one address if it performs more than one logical function. And example would be combining Timing and Machine NC functionality into a single NC.

Identifier, Broadcast Messages $b_{10}$-$b_9$ Priority bits—These are used to specify the priority of the message. They are used to insure that important messages get through immediately. Code '00' has the highest priority.

$b_8$ Broadcast/Individual—Defines the class of the message. When this bit is '1' the message is a Broadcast Message.

$b_7$ Spare—For future use.

$b_6$-$b_5$ Spare—For future use.

$b_4$-$b_0$ Command—There are thirty-two possible broadcast commands that can be sent. The Command bits are used to specify the predetermined group that the message applies to, and how the receiving device should interpret the data bits.

Data, Individual Messages $byte_0$ Sequence Number—Number that corresponds to the next number in sequence for messages being sent from the sending device to the receiving device.

$byte_1$ Message Number—Defines the Message. See the Messages section.

$byte_2$ Data—See individual message for data definition.

$byte_7$

Data, Broadcast Messages $byte_0$ Sequence Number—Number that corresponds to the next number in sequence for all broadcast messages.

$byte_1$ Source Address—The address of the device sending the broadcast message. See above for address description.

$byte_2$ Source Address-Data—See individual message for data definition.

$byte_7$

Note: "Command" is used to refer to the bits that define the function of a Broadcast CAN message and "Message" is used to refer to the bits that define the function of a Individual CAN message.

Sequence Numbers

Most messages will have a sequence number to insure that no messages are lost. The number will start at zero, and be incremented for each message sent to a particular device. A sending device will keep a separate count for each device it sends messages to. All devices will maintain the count for broadcast messages. See the Messages section for details on which messages have sequence numbers.

Identifier Construction

The basic unit for CAN messages is the byte. The identifier is composed of two bytes. Each byte is built up separately by combining together defined constants and variables. The constants can be bitwise "ORed," or they can be mathematically added. Note that the constants are byte length. If the identifier is being treated as a word, use the word length constants for the high order byte (Byte1). See below for a list of certain defined constants.

A typical identifier for a Broadcast message would be:
Identifier_Byte_1=(STD_PRI|BROADCAST_MSG);
Identifier_Byte_0=(COMMAND_00);

A typical identifier for a message sent from a CC to a Feeder NC would be:
Identifier_Byte_0=(MEDIUM_PRI|INDIVIDUAL_MSG);
Identifier_Byte_1=((char)feeder_addr & ADDR_MASK);

Note: It is not necessary to include the SPARE constants.

Example of a Broadcast Message

Query NC Status - Queries all NCs for status.

Command #: 1(01h) BROADCAST_QUERY_NC_STATUS
Type: Broadcast
Priority: Standard
From: CC
To: All NCs
Acknowledge: N/A
Data Desc.: No Data Identifier

| $b_{10}$ | $b_9$ | $b_8$ | $b_7$ | $b_6$ | $b_5$ | $b_4$ | $b_3$ | $b_2$ | $b_1$ | $b_0$ |
|---|---|---|---|---|---|---|---|---|---|---|
| 1 | 0 | 1 | 0 | 0 | 0 | 0 | 0 | 0 | 0 | 1 |
| Pri. 1 | Pri. 0 | B/I | Spare | Spare | Spare | Cmd 4 | Cmd 3 | Cmd 2 | Cmd 1 | Cmd0 |

Data

| $Byte_0$ | $Byte_1$ | $Byte_2$ | $Byte_3$ | $Byte_4$ | $Byte_5$ | $Byte_6$ | $Byte_7$ |
|---|---|---|---|---|---|---|---|
| BC Seq # | CC Addr. | No Data | No Data | No Data | No Data | No Data | No Data |
| Seq. # | Src. Addr. | Data 2 | Data 3 | Data 4 | Data 5 | Data 6 | Data 7 |

Example of an Individual Message

Device Activate - Used to activate an output or function for a device

Message #: 3 (03h) DEVICE_ACTIVATE
Type: Individual
Priority: Standard
From: CC
To: Any NC
Acknowledge: N/A
Data Desc.: Byte 2 - Activate ID (Specific to NC type)
Byte 3 - Parameter 1 (Optional)
Byte 4 - Parameter 2 (Optional)

Identifier

| $b_{10}$ | $b_9$ | $b_8$ | $b_7$ | $b_6$ | $b_5$ | $b_4$ | $b_3$ | $b_2$ | $b_1$ | $b_0$ |
|---|---|---|---|---|---|---|---|---|---|---|
| 1 | 0 | 0 | 0 | 0 | 0 | 0 | 0 | 0 | 0 | 0 |
| Pri. 1 | Pri. 0 | B/I | Spec | Addr6 | Addr5 | Addr4 | Addr3 | Addr2 | Addr1 | Addr0 |

-continued

Device Activate - Used to activate an output or function for a device

Data

| $Byte_0$ | $Byte_1$ | $Byte_2$ | $Byte_3$ | $Byte_4$ | $Byte_5$ | $BByte_6$ | $Byte_7$ |
|---|---|---|---|---|---|---|---|
| Seq # | 0x04 | Activate ID | Parm 1 | Parm 2 | No Data | No Data | No Data |
| Seq. # | Msg. # | Data 2 | Data 3 | Data 4 | Data 5 | Data 6 | Data 7 |

What is claimed is:

1. A variable vacuum control system, comprising:

a vacuum source and an air source;

a movable suction cup coupled to the vacuum source and an air source for periodically grabbing and removing a flat item from a bottom of a stack of flat items held in a hopper positioned above the suction cup by means of vacuum suction, the hopper having a slanted bottom wall and a front wall with a jogger which moves backward and forward to keep the flat items aligned in the hopper;

a variable speed rotating drum for receiving each fiat item after removal, the drum moving at a variable speed relative to the hopper;

at least one sensor/encoder associated with the drum for sensing the speed and position of the drum relative to the hopper and generating speed and position signals corresponding thereto; and a servo drive coupled to the sensor/encoder to control at least one vacuum/air valve, whereby, upon detecting a change in speed of the drum, the servo drive automatically alters control signals to the valve to alter the application of vacuum and air to the suction cup corresponding to the change in speed of the drum.

2. The system of claim 1, adapted for use in a machine for inserting flat items into folded items.

3. The system of claim 2, wherein the machine is an insert machine for automatically inserting flat paper items into open sides of partially folded newspapers.

4. The system of claim 1, wherein the sensor / encoder comprises an encoder for generating timing signals as the drum moves.

5. The system of claim 1, wherein the servo drive includes a servo control and memory storing data representative of (a) a plurality of speeds of rotation of the drum; and (b) predetermined vacuum and air start and stop times for each speed, each time corresponding to an angular movement of a point on the drum relative to a fixed reference point for each speed.

* * * * *